(12) United States Patent
Sodagar

(10) Patent No.: US 12,293,218 B2
(45) Date of Patent: May 6, 2025

(54) METHOD AND APPARATUS FOR A STEP-ENABLED WORKFLOW

(71) Applicant: Tencent America LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 500 days.

(21) Appl. No.: 17/027,569

(22) Filed: Sep. 21, 2020

(65) Prior Publication Data

US 2021/0096904 A1    Apr. 1, 2021

Related U.S. Application Data

(60) Provisional application No. 62/907,626, filed on Sep. 28, 2019.

(51) Int. Cl.
*G06F 9/48* (2006.01)
*G06F 9/50* (2006.01)
*G06F 9/54* (2006.01)

(52) U.S. Cl.
CPC ............ *G06F 9/485* (2013.01); *G06F 9/4881* (2013.01); *G06F 9/5038* (2013.01); *G06F 9/542* (2013.01); *G06F 9/544* (2013.01)

(58) Field of Classification Search
CPC ...... G06F 9/485; G06F 9/4881; G06F 9/5038; G06F 9/542; G06F 9/544
See application file for complete search history.

(56) References Cited

U.S. PATENT DOCUMENTS 5,289,577 A * 2/1994 Gonzales ............. H04N 19/436
                                                                345/565
6,260,082 B1 * 7/2001 Barry ....................... G06F 13/28
                                                                710/33

(Continued)

FOREIGN PATENT DOCUMENTS

CN         104487948 A      4/2015

OTHER PUBLICATIONS

PCT International Search Report and Written Opinion issued in Application PCT/US 20/52687 on Jan. 28, 2021, 12 pages.

(Continued)

*Primary Examiner* — April Y Blair
*Assistant Examiner* — Jonathan R Labud
(74) *Attorney, Agent, or Firm* — ARENTFOX SCHIFF LLP

(57) ABSTRACT

Aspects of the disclosure provide methods and an apparatus including processing circuitry configured to receive workflow information of a workflow. The processing circuitry generates, based on the workflow information, the workflow to process input data. The workflow includes a first processing task, a second processing task, and a first buffering task. The first processing task is caused to enter a running state where a subset of the input data is processed and output to the first buffering task as first processed subset data. The first processing task is caused to transition to a paused state based on an amount of the first processed subset data in the first buffering task being equal to a first threshold. State information of the first processing task is stored in the paused state. Subsequently, the second processing task is caused to enter a running state where the first processed subset data is processed.

16 Claims, 13 Drawing Sheets

(56) References Cited

U.S. PATENT DOCUMENTS

| | | | |
|---|---|---|---|
| 9,317,542 B2* | 4/2016 | Agarwal | G06F 16/00 |
| 9,342,063 B1* | 5/2016 | Iakhnine | G06Q 10/06 |
| 2003/0206173 A1 | 11/2003 | Kawai et al. | |
| 2006/0117316 A1* | 6/2006 | Cismas | G06F 9/52 |
| | | | 718/103 |
| 2007/0189617 A1 | 8/2007 | Yamamoto | |
| 2012/0209654 A1* | 8/2012 | Romagnino | G16H 40/20 |
| | | | 705/7.27 |
| 2014/0074905 A1* | 3/2014 | Schincariol | H04L 67/10 |
| | | | 709/201 |
| 2015/0178220 A1* | 6/2015 | Grubisic | G06F 12/1027 |
| | | | 711/202 |
| 2017/0052824 A1* | 2/2017 | Sharma | G06F 9/453 |
| 2017/0060579 A1 | 3/2017 | Vincent et al. | |
| 2018/0353106 A1* | 12/2018 | Han | A61B 5/0024 |
| 2021/0055948 A1* | 2/2021 | Tsirkin | G06F 9/45558 |

OTHER PUBLICATIONS

Text of ISO/IEC DIS 23090-8 Network-based Media Processing; ISO/IEC JTC1/SC29/WG11 Coding of Moving Pictures and Audio, Technical Committee ISO/IEC JTC 1 Information technology, Subcommittee SC 29, 2018,156 pages.

Chinese Office Action issued Aug. 15, 2023 in Application No. 202080032299.2, pp. 1-30.

Supplementary European Search Report issued Aug. 17, 2023 in Application No. 20869944.7, pp. 1-9.

* cited by examiner

METHOD AND APPARATUS FOR A STEP-ENABLED WORKFLOW

INCORPORATION BY REFERENCE

This present disclosure claims the benefit of priority to U.S. Provisional Application No. 62/907,626, "Stateful Step-Enabled Workflows for Cloud Computing" filed on Sep. 28, 2019, which is incorporated by reference herein in its entirety.

TECHNICAL FIELD

The present disclosure describes embodiments generally related to data processing including processing of one or more workflows.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Workflows can be used in data processing to process data, such as media data, in a data processing system. In some examples, a workflow includes a large number of processing tasks. When the large number of tasks runs in parallel to process data, the data processing system needs to dedicate a large amount of resources.

SUMMARY

Aspects of the disclosure provide a method and an apparatus for processing a workflow. The apparatus includes processing circuitry configured to receive workflow information of the workflow. The processing circuitry can generate, based on the workflow information, the workflow to process input data. The workflow can include a plurality of processing tasks and a first buffering task. The plurality of processing tasks can include a first processing task and a second processing task. The processing circuitry can cause the first processing task to enter a running state in which a subset of the input data is processed by the first processing task and output to the first buffering task as first processed subset data. The processing circuitry can cause the first processing task to transition from the running state to a paused state based on an amount of the first processed subset data stored in the first buffering task being equal to a first threshold. State information of the first processing task can be stored in the paused state. After the first processing task is transitioned to the paused state, the processing circuitry can cause the second processing task to enter a running state in which the first processed subset data stored in the first buffering task is processed by the second processing task.

In an embodiment, the second processing task is configured to output the processed first processed subset data as second processed subset data to a second buffering task in the running state. The processing circuitry can cause the second processing task to transition from the running state to a paused state based on one of: (i) an amount of the second processed subset data stored in the second buffering task being equal to a second threshold and (ii) the amount of the first processed subset data stored in the first buffering task being provided to the second processing task. State information of the second processing task can be stored in the paused state.

In an embodiment, the first buffering task is configured to generate an event indicating that the amount of the first processed subset data stored in the first buffering task is equal to the first threshold. In an example, the first buffering task is a first-in-first-out (FIFO) task configured with a FIFO buffer. The FIFO buffer can have a FIFO length that is equal to or larger than the first threshold. The FIFO task is configured to generate the event indicating that the amount of the first processed subset data stored in the FIFO task is equal to the first threshold. The FIFO task is configured to generate another event indicating that the amount of the first processed subset data stored in the FIFO task is provided to the second processing task.

In an embodiment, the subset of the input data is one of a plurality of subsets of the input data.

In an embodiment, a lifecycle of the first processing task includes transitioning between the paused state and one of the running state, an error state, and a destroyed state.

In an embodiment, the workflow includes a plurality of buffering tasks that includes the first buffering task. Each input of the plurality of processing tasks is from one of the input data and one or more of the plurality of buffering tasks. Only one of the plurality of processing tasks is allowed to be in the running state at any point in time.

In an embodiment, the input data includes the subset of the input data and another subset of the input data. The workflow includes a plurality of buffering tasks that includes the first buffering task. Each input of the plurality of processing tasks is from one of the input data and one or more of the plurality of buffering tasks. The processing circuitry can sequentially process the subset of the input data by the plurality of processing tasks. After the subset of the input data is processed by the plurality of processing tasks, the processing circuitry can sequentially process the other subset of the input data by the plurality of processing tasks. Remaining processing tasks in the plurality of processing tasks can be in paused states. Only one of the plurality of the processing tasks is allowed to be in the running state at any point in time.

Aspects of the disclosure provide a method and an apparatus for processing a plurality of workflows. The apparatus includes processing circuitry configured to receive workflow information of the plurality of workflows. The processing circuitry generate, based on the workflow information, the plurality of workflows to process input data. At least one of the plurality of workflows includes a plurality of processing tasks, and the plurality of workflows includes a first workflow and a second workflow. The processing circuitry can cause the first workflow to enter a running state in which a subset of the input data is processed by the first workflow and output to a buffering task as first processed subset data. The processing circuitry can cause the first workflow to transition from the running state to a paused state based on an amount of the first processed subset data stored in the buffering task being equal to a threshold. State information of the first workflow can be stored in the paused state. After the first workflow is transitioned to the pause state, the processing circuitry can cause the second workflow to enter a running state in which the first processed subset data stored in the buffering task is processed by the second workflow.

In an example, the buffering task is configured to generate an event that indicates the amount of the first processed subset data stored in the buffering task is equal to the threshold. In an example, the buffering task is a FIFO task configured with a FIFO buffer. The FIFO buffer has a FIFO length that is equal to or larger than the threshold. The FIFO task is configured to generate the event indicating that the amount of the first processed subset data stored in the FIFO task is equal to the threshold. The FIFO task is configured to generate another event indicating that the amount of the first processed subset data stored in the FIFO task is provided to the second workflow.

In an example, the subset of the input data is one of a plurality of subsets of the input data.

Aspects of the disclosure also provide a non-transitory computer-readable medium storing instructions which when executed by a computer for video decoding cause the computer to perform any of the methods for processing one or more workflows.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
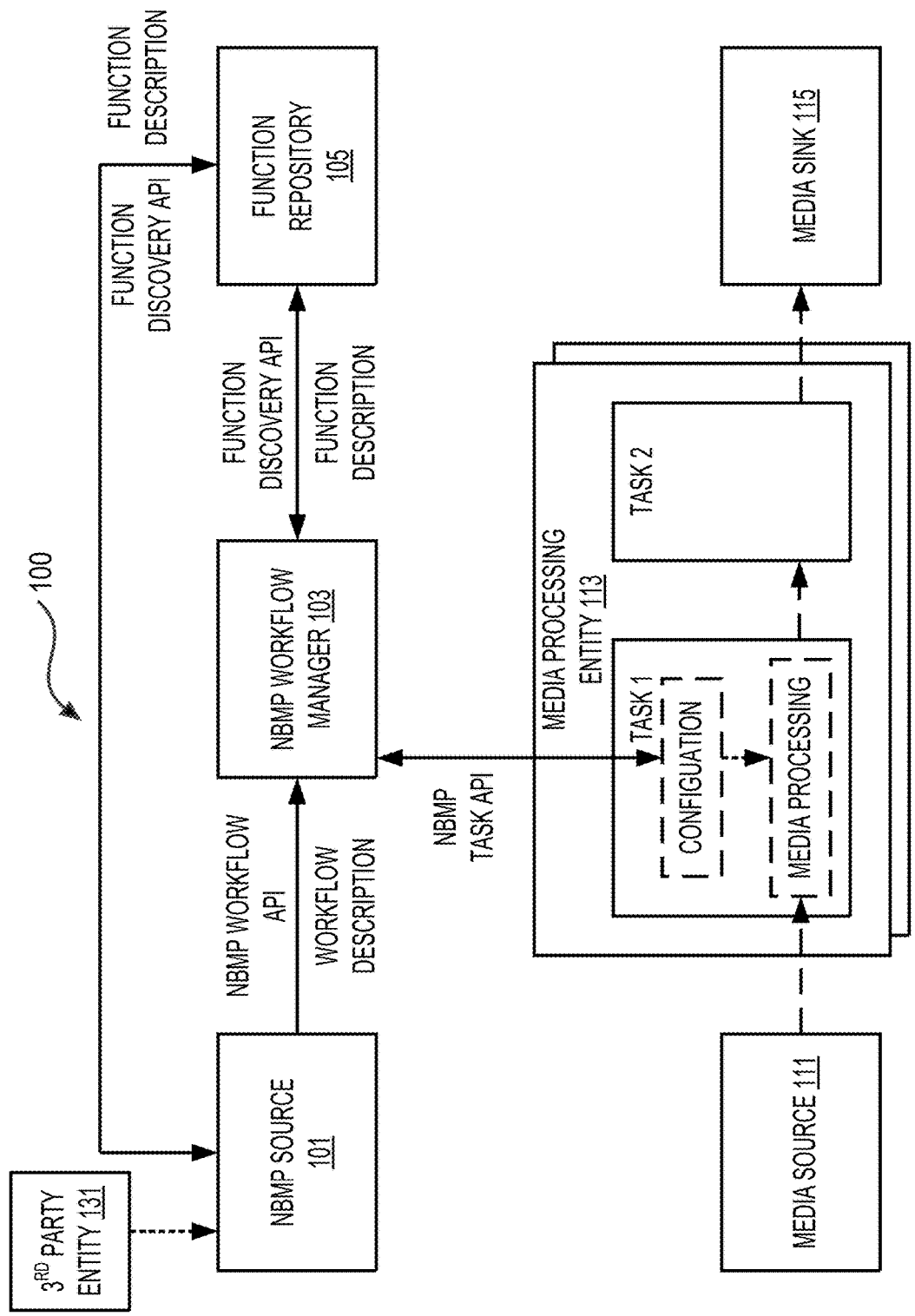
FIG. 1 shows an exemplary data processing system according to an embodiment of the disclosure.

Aspects of the disclosure are related to data processing (e.g., media processing in a network). A data processing source (e.g., a network-based media processing (NBMP) source) can describe a requested data processing (e.g., a requested media processing) and provide control information for data (e.g., media data) to be processed. Accordingly, a workflow manager (e.g., an NBMP workflow manager) can establish a workflow (e.g., a media processing workflow, an NBMP workflow) and can inform the data processing source (e.g., the NBMP source) that the workflow is ready, and thus the data processing can start. Data source(s) (e.g., media source(s)) can then start transmitting the data, for example, to the network for processing.

In general, a workflow can include processing tasks or tasks (e.g., media processing tasks). A connected graph can represent the workflow by using connections to represent input/output relationships among the processing tasks. Thus, the workflow can be considered as the connected graph of the processing tasks. Each task can perform an operation (e.g., media processing operation), such as video decoding, video stitching, video encoding, and/or the like. The workflow manager can ensure correct operation of the workflow by configuring and monitoring each task and a workflow output. The workflow manager can be configured to select processing functions (e.g., media processing functions) and instantiating the processing functions (e.g., the media processing functions) as respective tasks based on a workflow description that, for example, is received from the data processing source (e.g., the NBMP source).

Processing entities (e.g., media processing entities) that are configured to run the processing tasks can be established, loaded, instantiated, and monitored. Interfaces such as application programming interfaces (APIs) can be defined between the data processing source and the workflow manager, the workflow manager and the processing task(s), and an API to discover appropriate function(s). In general, a data processing system or platform (e.g., a NBMP platform) can be data format (e.g., media format) and protocol agnostic. The data processing system can identify and signal the data (e.g., the media data), metadata and auxiliary information formats for data exchanged between a data source (e.g., a media source), the workflow manager, and tasks.

The data processing framework (e.g., the NBMP framework) can define interfaces including both data formats and APIs among various entities connected through digital networks for data processing. Users can access and configure user operations remotely for efficient and intelligent processing. The data can be uploaded, for example, to the network, the processing tasks can be instantiated, and the processing tasks can be further configured. The data processing framework can enable dynamic creation of data processing pipelines (e.g., media processing pipelines), as well as access to processed data and metadata in real-time or in a deferred way. The data and metadata formats used between the data source, the workflow manager, and the data processing entities in a data processing pipeline can be specified.

The data processing framework can enable clients (e.g., creators, service providers, and consumers of digital media) to describe data processing operations to be performed by the data processing entities, for example, in the network. A workflow can be described by composing a set of data processing functions that are accessible through interfaces (e.g., NBMP APIs). A data processing entity (e.g., a media processing entity (MPE)) can run processing tasks applied on the data and the related metadata received from data source(s) or other tasks. The data processing entity (e.g., MPE) can provide capabilities for configuring, managing, and monitoring processing tasks. A data processing task can be a process applied to data and metadata input(s), producing data and related metadata output(s) to be consumed by a data sink (e.g., a media sink) or other data processing tasks (e.g., media processing tasks).

The data processing framework can support various delivery methods such as streaming, file delivery, push-based progressive download, hybrid delivery, multipath, and heterogeneous network environments.

FIG. 1 shows an exemplary data processing system (e.g., NBMP system, a NBMP reference architecture, a NBMP architecture) (100) according to an embodiment of the disclosure. The data processing system (100) can include a plurality of entities, such as a data source (e.g., a NBMP source, a NBMP source entity) (101), a workflow manager (e.g., a NBMP workflow manager) (103), a function repository (105), a data source or a data source entity (e.g., a media source, a media source entity) (111), a data processing entity (e.g., a MPE) (113), a data sink or a data sink entity (e.g., a media sink or a media sink entity) (115), a third party entity, and/or the like. The data processing system (100) can include additional data source(s), data sink(s), and/or data processing entities. The data processing system (100) can process data across one or more processing entities in a network. Information, such as various data and control information (or control data) for the data, can be communicated among the plurality of entities in the data processing system (100).

To provide a context for discussion purposes, the data processing system (100) is described as the NBMP system (100) below. The descriptions can be suitably adapted to any data processing system.

The NBMP source (101) can describe, or otherwise indicate, media processing in the network. The function repository (105) can include NBMP function descriptions of various NBMP functions. The NBMP source (101) and the workflow manager (103) can retrieve the NBMP function descriptions or functions from the function repository (105). An NBMP function can refer to implementation of a stand-alone and self-contained media processing operation and/or the corresponding description of the operation.

A processing task or a task can refer to a runtime instance of a NBMP function that is executed by the MPE (113). An NBMP workflow or a workflow can be represented by a graph (e.g., a directed acyclic graph (DAG)) of one or more connected task(s) that achieve the requested media processing. The workflow manager (103) can provision task(s) and connect the task(s) to create, control, manage and monitor a workflow, for example, based on a workflow description document (WDD).

The media source (111) can provide media content (e.g., media data, supplementary information) to be processed by a workflow. The supplementary information can include metadata or auxiliary information related to the media data. The media source (111) can provide an input to the workflow. The media sink (115) can consume an output of the workflow. The MPE (113) can run one or more media processing task(s) to process the media content.

Different entities (e.g., the NBMP Source (101), the workflow manager (103) and the MPE (113)) in the NBMP system (100) can use APIs to invoke and respond to media service requests. The APIs can include a NBMP workflow API or a workflow API, a function discovery API, and a task API. The workflow API can provide an interface between the NBMP Source (101) and the workflow manager (103). The task API can provide an interface between the workflow manager (103) and media processing tasks. The function discovery API can provide an interface between the workflow manager (103)/the NBMP Source (101) and the Function Repository (105).

NBMP interfaces described above can be used to create and control media processing workflows in the network. The NBMP system (100) can be split into a control plane and a media plane (or media data plane). The control plane can include the workflow API, the function discovery API, and the task API.

The workflow API can be used by the NBMP source (101) to create and control a media processing workflow. The NBMP Source (101) can use the workflow API to communicate with the workflow manager (103) for configuring and controlling media processing in the network. When the NBMP Source (101) sends a request to the workflow manager (103) by including a workflow resource (WR) in an operation of the workflow API, the workflow manager (103) can parse the WR, the included WDD and corresponding descriptors, and take the appropriate actions according to the requested operation. Then, the workflow manager (103) can acknowledge the request with a response. The workflow API operations can include creating a workflow (e.g., CreateWorkflow), updating a workflow (e.g., UpdateWorkflow), deleting a workflow (e.g., DeleteWorkflow), retrieving a workflow (e.g., RetrieveWorkflow), and the like.

The function discovery API can provide the means for the workflow manager (103) and/or the NBMP Source (101) to discover media processing functions that can be loaded as part of a media processing workflow.

The task API can be used by the workflow manager (103) to configure and monitor task(s) (e.g., a task 1 and a task 2 run by the MPE (113)) at runtime. The task API can define interface(s) for configuration of media processing tasks by the workflow manager (103), for example, after the resources for the task are allocated in the MPE (113). Task API operations can include creating a task (e.g., CreateTask), updating a task (e.g., UpdateTask), getting a task (e.g., GetTask), deleting a task (e.g., DeleteTask), and the like.

On the media plane, the media formats, the metadata, and the supplementary information formats between the NBMP Source (111) and task(s), as well as between the tasks can be defined.

A workflow description (WD) can be passed from the NBMP source (101) to the workflow manager (103). The WD can describe information such as input data and output data, functions and other requirements for the workflow.

The workflow manager (103) can receive a WDD from the NBMP source (101) and can build a workflow for requested media processing. In a workflow procedure, media processing functions can be selected, for example, from the function repository (105), and then corresponding media processing tasks can be configured and distributed to a set of one or more MPEs (e.g., including the MPE (113)).

The set of functions provided by the function repository (105) can be read by an NBMP source (101) and the workflow manager (103). In an embodiment, the NBMP source (101) requests the creation of a workflow using a set of functions in the function repository (105). Accordingly, the NBMP source (101) is configured to select functions for the workflow. The NBMP source (101) can request the creation of the workflow as described below. The NBMP source (101) can use a description of the media processing tasks by which the workflow is to be created, and can specify a connection map to define connections of inputs and outputs of the media processing tasks. When the workflow manager (103) receives the above information from the NBMP source (101), the workflow manager (103) can instantiate the media processing tasks based on respective function names and can connect the media processing tasks according to the connection map.

Alternatively, the NBMP source (101) can request the creation of a workflow using a set of keywords by which the workflow manager (103) can construct the workflow. Accordingly, the NBMP source (101) may not be aware of a set of functions to be inserted into the workflow. The NBMP source (101) can request the creation of the workflow as described below. The NBMP source (101) can use the set of keywords by which the workflow manager (103) can find the appropriate functions, and can specify the requirements of the workflow using suitable workflow description.

When the workflow manager (103) receives the above information (e.g., the set of keywords) from the NBMP source (101), the workflow manager (103) can create the workflow by searching for appropriate functions using the keywords, for example, specified in a processing descriptor.

The workflow manager (103) can then use other descriptors in the workflow description to provision the media processing tasks and connect the media processing tasks to create the final workflow.

A processing model of the workflow manager (103) can be described as below.

The workflow manager (103) can discover available media processing functions as below. The NBMP function repository (105) can provide the function discovery interface (or API) to allow external entities to query for a media processing function that can fulfil the requested processing. The workflow manager (103) can have access to a directory service that offers a searchable list of media processing functions. The workflow manager (103) can use the description of the media processing tasks in the workflow description to find the appropriate functions for the workflow.

Selection of the media processing tasks for the workflow can be described below. When a request for media processing is received from the NBMP source (101), the workflow manager (103) can search the function repository (105) to find the list of all available functions that can fulfill the workflow. Using the workflow description from the NBMP Source (101), the workflow manager (103) can find the functions from the function repository (105) to implement the workflow, which can depend on the information for media processing from the NBMP Source (101). The information for media processing can include the input and output description, the description of the requested processing, and the information in other descriptors for functions in the function directory (105). Mapping of the source requests to appropriate media processing tasks to be included in the workflow can be a part of the implementation of the NBMP in the network. To reference and link input sources with input port names and output port names at the time of task creation, the input-ports and output-ports can be used to make references to the input streams.

A search for appropriate functions to be instantiated as tasks can be performed by the workflow manager (103) using a function discovery API. Alternatively, the workflow manager (103) can retrieve detailed information of some or all suitable functions in the function repository (105) using the function discovery API. The workflow manager (103) can then compare the information for media processing from the NBMP source (101) with different descriptors of each function.

Selected media processing tasks can be configured in the workflow. When the functions to be included in the workflow are identified, the NBMP workflow manager (103) can instantiate the functions as respective tasks and configure the tasks so that the tasks can be added to the workflow. The NBMP workflow manager (103) can extract the configuration data from the media processing information received from the NBMP source (101) and configure the corresponding tasks. The configuration of the Tasks can be performed using a task API (e.g., NBMP task API).

Task allocation and distribution can be described below. The workflow manager (103) can use the workflow to perform processing deployment and configure the media processing entities. In an example, for computationally intensive media processing requests, the workflow manager (103) can set up multiple computational instances and distribute a workload among the multiple computational instances. Thus, the workflow manager (103) can connect and configure the multiple computational instances as needed. In an example, the workflow manager (103) allocates a same task to multiple instances and provisions a load balancer to distribute the workload among the multiple instances using a chosen scheduling mechanism. In an alternative example, the workflow manager (103) allocates different operations of the same task to different instances (e.g., parallel operations). In both examples described above, the workflow manager (103) can set up the workflow paths between the instances, and thus the suitable workload can be successfully realized. The workflow manager (103) can configure the tasks to push the processed media data/ streams (or make them available through a pull mechanism) to a next task in the workflow graph.

When the workflow manager (103) receives a WDD from the NBMP Source (101), the workflow manager (103) can perform a selection of media processing functions to be inserted into the workflow. When the list of tasks to be included in the workflow is compiled, the workflow manager (103) can then connect the tasks to prepare the workflow.

Figure 2A:
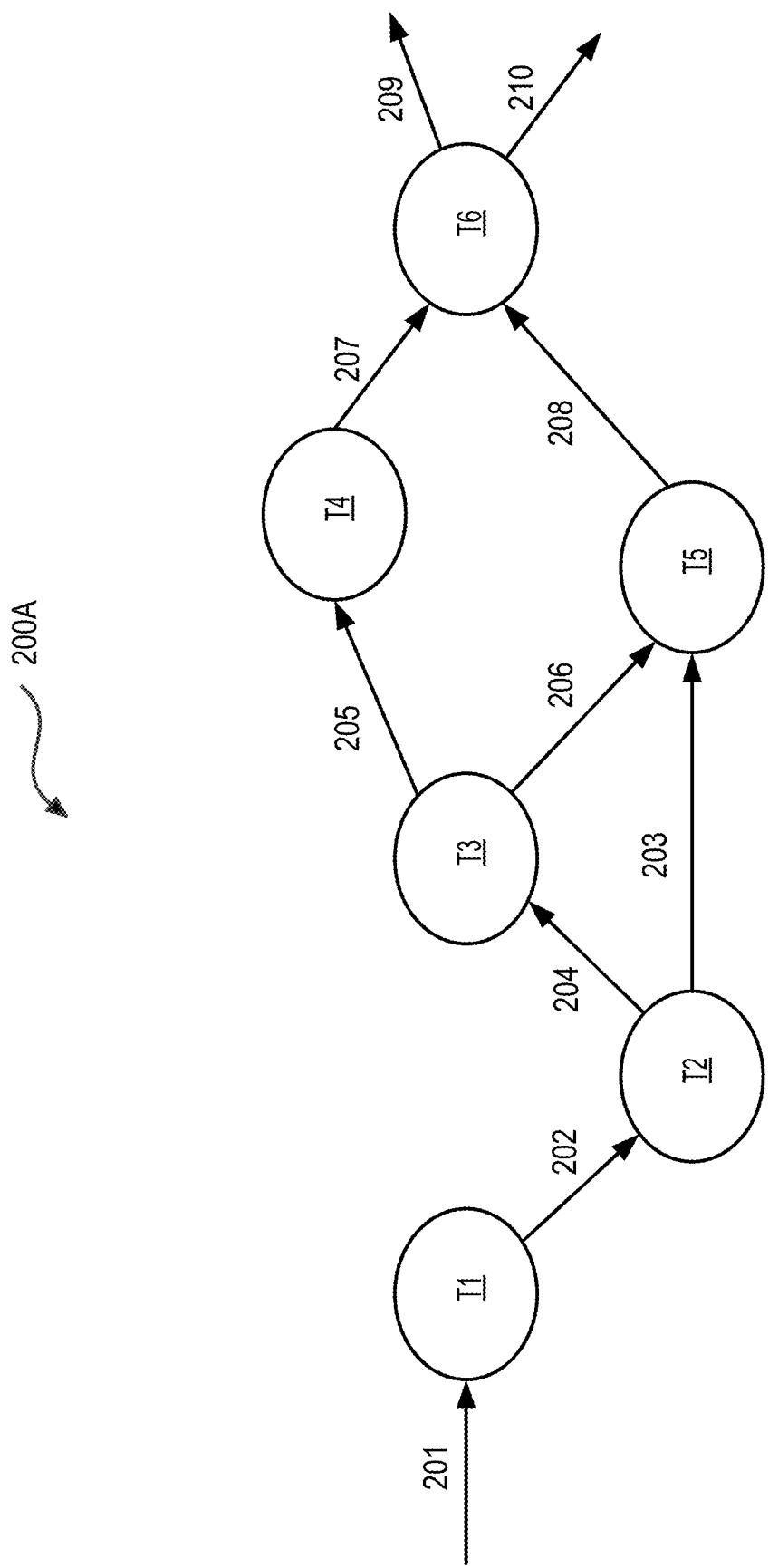
FIGS. 2A-2C show examples of workflows according to embodiments of the disclosure.

The workflow manager (103) can generate a workflow, for example, as represented by a graph (e.g., a DAG) from the WDD. FIG. 2A shows an example of a graph (e.g., a DAG) (200A) according to an embodiment of the disclosure. The DAG (200A) can include a plurality of nodes (T1)-(T6) and a plurality of links (or connections) (202)-(208). In an example, the DAG (200A) represents the workflow (200A).

Each node of the DAG (200A) can represent a media processing task in the workflow (200A). A link (e.g., the link (202)) connecting a first node (e.g., the node (T1)) to a second node (e.g., the node (T2)) in the DAG (200A) can represent a transfer of an output of the first node (e.g., the node (T1)) as an input to the second node (e.g., the node (T2)).

In general, a workflow can include any suitable number of input(s) (or workflow input(s)) and any suitable number of output(s) (or workflow output(s)). The workflow input(s) can be connected to the media source (111), other workflow(s), and/or the like, and the workflow output(s) can be connected to the media sink (115), other workflow(s), and/or the like. The workflow (200A) has an input (201) and outputs (209) and (210). The workflow (200A) can have one or more outputs from intermediate nodes in some embodiments.

Figure 4A:
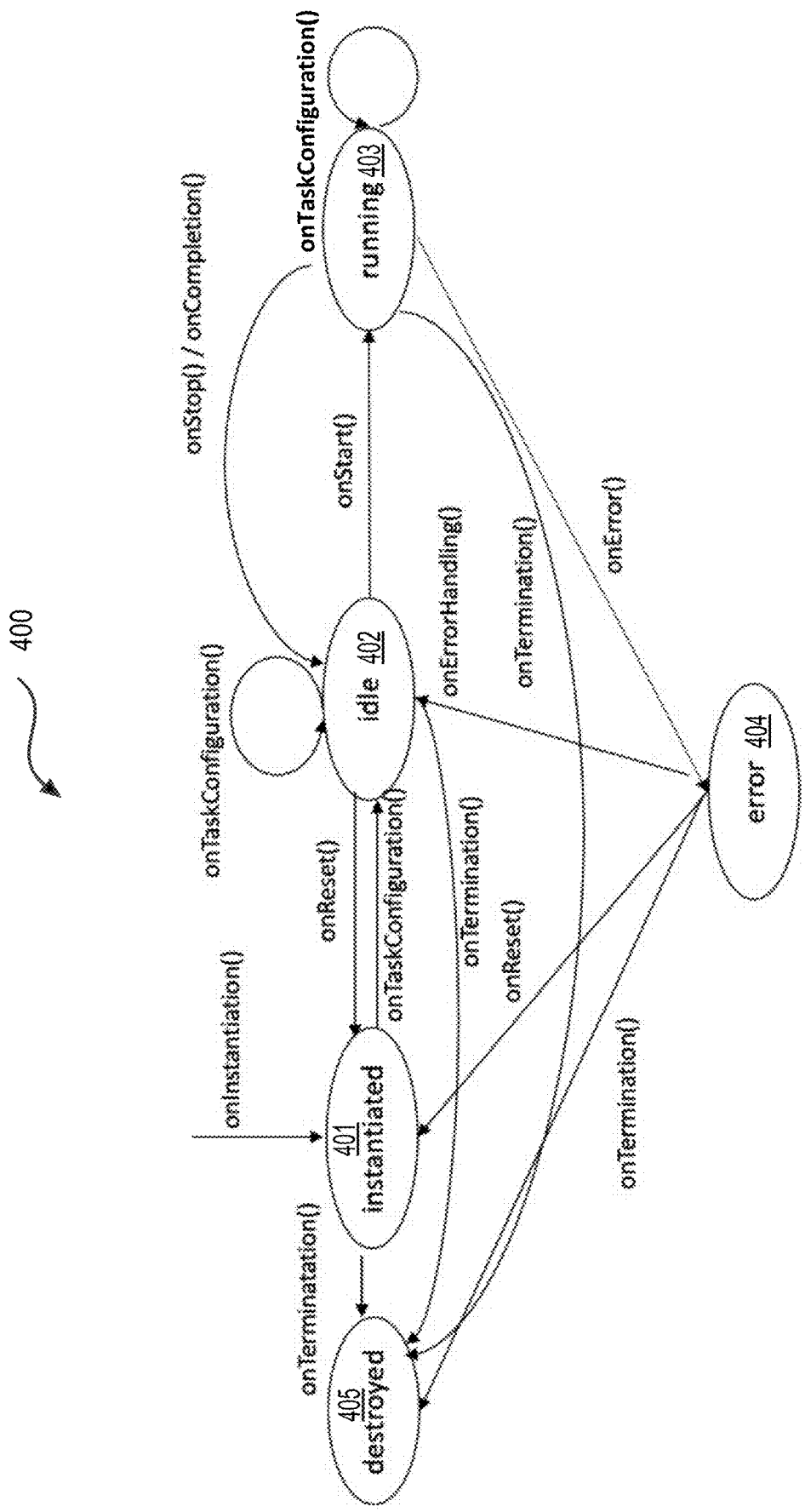
FIG. 4A shows an exemplary task lifecycle of a processing task according to an embodiment of the disclosure.

FIG. 4A shows an exemplary task lifecycle (400) of a media processing task according to an embodiment of the disclosure. The task lifecycle (400) can apply to other types of processing tasks. The media processing task can transition through different states at different points of an execution of the media processing task. The different states in the task lifecycle (400) can include an instantiated state (401), an idle state (402), a running state (403), an error state (404), a destroyed state (405), and/or the like.

The instantiated state (401): the media processing task is in the instantiated state (401) when the media processing task is instantiated by the workflow manager (103), for example, through services of an infrastructure manager as represented using an onInstantiation transition. When the media processing task is configured (e.g., as represented using an onTaskConfiguration transition), the instantiated state (401) can be transitioned (or changed) to the idle state (402). Alternatively, if the media processing task is terminated (e.g., as represented using an onTermination transition), the media processing task can move to the destroyed state (405).

The idle state (402): when the media processing task is in the instantiated state (401) and the workflow manager (103) can perform a task configuration (e.g., as represented using the onTaskConfiguration transition), the media processing task can move to the idle state (402). In the idle state (402), the media processing task is configured with the suitable processing. When the media processing task is started (e.g., as represented using the onStart transition), the media processing task can move to the running state (403). Alternatively, in the idle state (402), the media processing task can be reconfigured and stay in the idle state (402). In the idle state (402), if the media processing task is terminated (e.g., as represented using the onTermination transition), the media processing task can move to the destroyed state (405). In the idle state (402), if the media processing task is reset (e.g., as represented using the onReset transition), the media processing task can move to the instantiated state (401).

The running state (403): while the media processing task is in the idle state (402), and the media processing task is started (e.g., using the onStart transition), the media processing task can move from the idle state (402) to the running state (403). In the running state (403), the media processing task assigned to the MPE (113) can process data (e.g., media data from the media source (111)) that the media processing task receives from either a previous media processing task in the workflow or the NBMP source (101). Alternatively, in the running state (403), if the workflow manager (103) can perform reconfiguration of the media processing task (e.g., as represented using the onTaskConfiguration transition), and if the reconfiguration results in processing reconfiguration with execution on current media/metadata streams to the media processing task, then the media processing task can stay in the running state (403). In the running state (403), if the media processing task is stopped (e.g., as represented using the onStop transition) or completed (e.g., as represented using the onCompletion transition), the media processing task can move to the idle state (402). In the running state (403), if the media processing task encounters an error (e.g., as represented using the onError transition), the media processing task can move to the error state (404). In the running state (403), if the media processing task is terminated (e.g., as represented using onTermination transition), the media processing task can move to the destroyed state (405).

The error state (404): the media processing task can be in the error state (404) when the media processing task encounters an error and cannot process the media data or metadata. Upon handling the error (e.g., as represented using the onErrorHandling transition), the media processing task can move back to the idle state (402). Alternatively, while in the error state (404), the media processing task can be reset (e.g., as represented using onReset transition) such that the media processing task can move to the instantiated state (401). In the error state (404), if the media processing task is terminated, the media processing task can move to the destroyed state (405).

The destroyed state (405): the media processing task can be in the destroyed state (405) when the media processing task is terminated by the workflow manager (103). The media processing task can be disposed of and cannot be reused.

A state of the media processing task can be reflected in a 'state' parameter of a general descriptor. In some examples, each of the above transitions except the onError transition can occur by a task operation initiated by the workflow manager (103). The OnError transition can occur due to an internal state change of the media processing task.

Figure 4B:
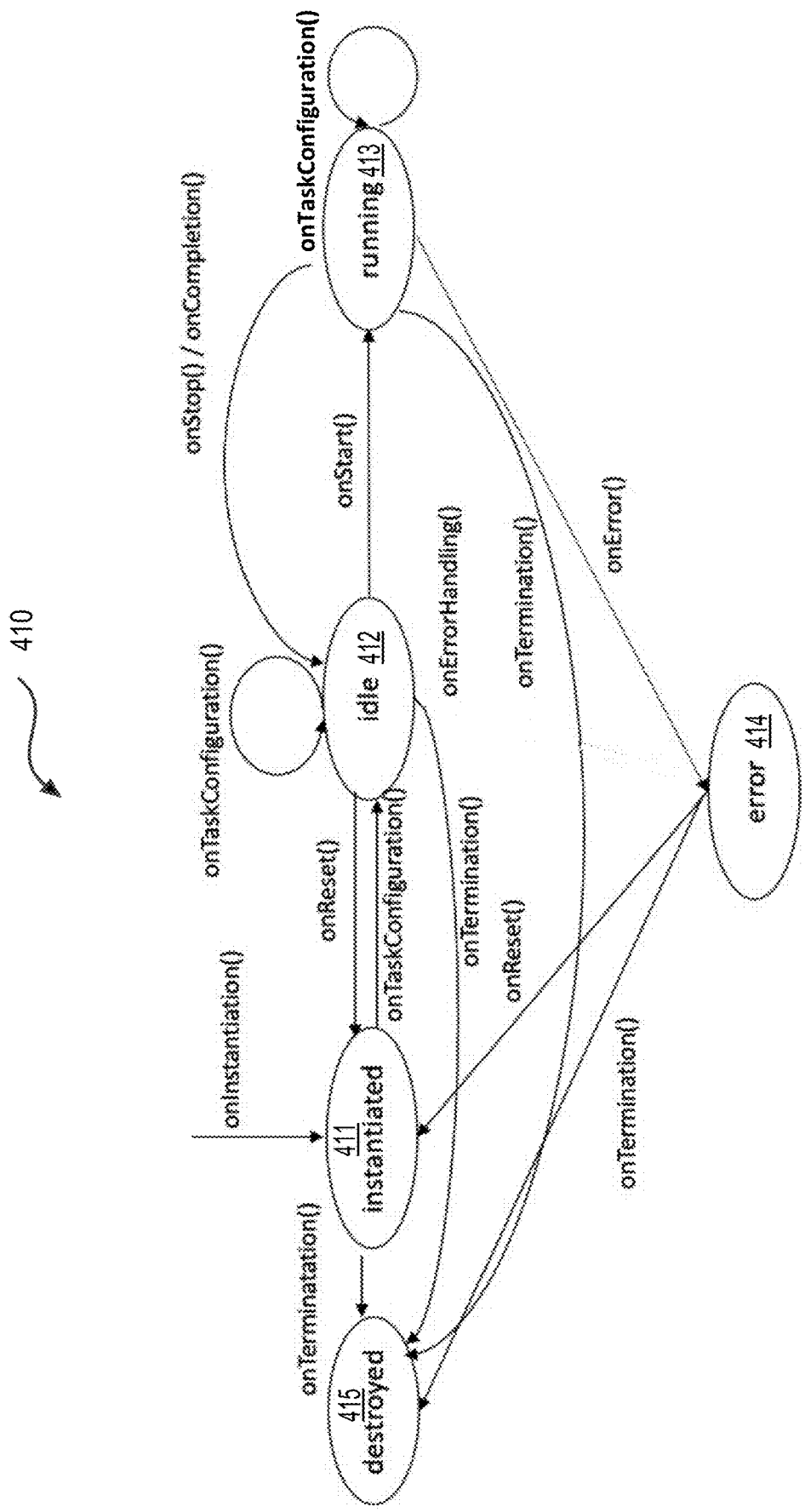
FIG. 4B shows an exemplary task lifecycle of a workflow according to an embodiment of the disclosure.

FIG. 4B shows an exemplary workflow lifecycle (410) of a workflow according to an embodiment of the disclosure. The workflow can transition through different states at different points of an execution of the workflow. The different states in the workflow lifecycle (410) can include an instantiated state (411), an idle state (412), a running state (413), an error state (414), a destroyed state (415), and/or the like.

The instantiated state (411): the workflow can be put in the instantiated state (411) by the workflow manager (103), for example, through the services of infrastructure manager (e.g., as represented using onInstantiation transition). When the workflow is configured (e.g., as represented using onWorkflowConfig transition), the workflow can move to the idle state (412). Alternatively, if the workflow is terminated (e.g., as represented using onTermination transition) while in the instantiated state (411), the workflow can move to the destroyed state (415).

The idle state (412): when the workflow is in the instantiated state (412) and the workflow manager (103) performs workflow configuration (e.g., as represented using onWorkflowConfig transition), the workflow can move to the idle state (412). In the idle state (412), one or more MPEs are setup (e.g., via the infrastructure manager) and the tasks running in the MPEs are provisioned and configured. When the workflow is started (e.g., as represented using onStart transition), the workflow can move to the running state (413). Alternatively, in the idle state (412) the workflow can be reconfigured. The workflow can stay in the idle state (412) waiting for media data or metadata to arrive. In the idle state (412), if the workflow is terminated (e.g., as represented using onTermination transition), the workflow can move to the destroyed state (415). In the idle state (412), if the workflow is reset (e.g., as represented using onReset transition), the workflow can move to the instantiated state (411).

The running state (413): while the workflow is in the idle state (412), and the workflow is started (e.g., using onStart transition), the workflow can move from the idle state (412) to the running state (413). In the running state (413), the data from the NBMP Source (101) can be processed by the MPEs in the workflow. Alternatively, in the running state (413), if the workflow manager (103) performs reconfiguration of the workflow (e.g., as represented using onWorkflowConfig transition), and if the reconfiguration results in processing reconfiguration with execution on current media/metadata streams, then the workflow can stay in the running state (413). In the running state (413), if the workflow is stopped (e.g., as represented using onStop transition), or the processing is completed (e.g., as represented using onComplete transition), the workflow can move to the idle state (412). In the running state (413), if the workflow encounters an error (e.g., as represented using onError transition), the workflow can move to the error state (414). In the running state (413), if the workflow is terminated (e.g., as represented using onTermination transition), the workflow can move to the destroyed state (415).

The error state (414): the workflow is in the error state (414) when the workflow encounters an error and cannot continue with workflow processing. Upon handling the error (e.g., as represented using onErrorHandling transition), the workflow can move back to the idle state (412). Alternatively, while in the error state (414), the workflow can be reset (e.g., as represented using onReset transition) such that the workflow can move to the instantiated state (411). In the error state (414), if the workflow is terminated, the workflow can move to the destroyed state (415).

The destroyed state (415): the workflow is in the destroyed state (415) when the workflow is terminated by the workflow manager (103). The workflow can be instantiated for the workflow to be used again.

In some examples, each of the above transitions except the onError transition can occur by a workflow operation initiated by the NBMP source (101). The OnError transition can occur due to internal state changes of the workflow.

In an example, a concept of processing media on a cloud is developed by an NBMP project. However, a NBMP design does not provide a single method for monitoring, reporting, and notification. In some examples, the message format for reporting or notification is not defined.

In some examples, partial running of a NBMP workflow is not allowed, and thus all the tasks in the workflow are to be instantiated for the workflow to operate and all the tasks are to work simultaneously. Therefore, the underlying platform is to dedicate resources (e.g., computational resources, memory resources, bandwidths) to all the tasks in the workflow at a same time. The substantial allocation of resources may not be available or may be available but at a high cost.

To increase media processing efficiency, faster and lower cost deployment of media services, and the ability to provide large scale deployment by leveraging public, private or hybrid cloud services, aspects of the disclosure provide methods and apparatuses to allow a task in a workflow to be operated or run one step at a time and/or one group of steps at a time. The above functionality or the step-by-step mode is advantageous when there are not enough resources (e.g., memory resources, computational resources) for running the entire workflow at the same time. Methods and embodiments disclosed in the disclosure can be used in any suitable workflow implementation on cloud computing or on any suitable platform utilizing workflow(s).

According to aspects of the disclosure, a step mode function, such as a buffering function (e.g., a first-in-first-out function as described below), can be added to a workflow. The step mode function can enable a step-based operation or a step-by-step operation for tasks in the workflow or workflows in a plurality of workflows. Accordingly, multiple steps are used to process data. Using the step mode, the workflow can run tasks separately, and thus a subset of tasks in the workflow can run at a same time while remaining task(s) are not running. In an example, the workflow includes six tasks. In an example, the subset of tasks includes one task, and thus the one task can process data in a running state while the other five tasks are not running. The other five tasks can be in non-running states (e.g., a paused state as described below) and do not process data. In another example, the subset of tasks includes two tasks, and thus the two tasks can run at the same time while the other four tasks are not running.

In another example, the plurality of workflows includes a first workflow and a second workflow. When the first workflow is running to process data, the second workflow is in a non-running state (e.g., a paused state as described below) and does not process data.

In an embodiment, media data to be processed by the tasks in the workflow can include a plurality of subsets of the media data. According to aspects of the disclosure, the media data can be processed in a unit of one or more of the plurality of subsets, and can be processed in the step mode (or step-by-step). The step size can be one or more of the plurality of subsets. In some examples, the step size is determined by a property of the step mode function, such as a maximum amount of data that can be stored in a buffer configured for the buffering function before the buffer function generates an event to trigger a corresponding task.

A largest step size can be the entire media data and the media data is processed in a single step. In an example, the media data includes 100 frames, and includes 10 subsets. Each subset includes 10 frames. The media data can be processed in a single step having a step size of 100 frames. Alternatively, the media data can be processed in 10 steps having a step size of 10 frames.

Each task can run in one or more steps, and can process one of the plurality of subsets of the media data in one step. Tasks in the workflow can have different step sizes. Since the tasks may not have a same step size, certain task(s) may run multiple steps before other step(s) can process or start running. For example, the media data includes 100 frames (or pictures). A task (T1) can process 10 frames in one step, and a task (T2) uses 20 frames in one step. An output of the task (T1) provides data for an input of the task (T2). Therefore, the task (T1) can run two steps while (T2) is not running After the task (T1) runs two steps and generates 20 processed frames, the task (T1) can pause (not running) and then the task (T2) can run to process the 20 frames from the task (T1). In the above description, the task (T1) can run two steps before the task (T1) stops and the task (T2) can run one step before the task (T2) stops.

In each step of a task execution, a portion (e.g., one of the plurality of subsets, such as 10 frames) of the media data (e.g., 100 frames) can be processed, and an output (also referred to as task output) of the task having a limited duration (or a limited length, a limited size) can be generated. Then state information (e.g., internal states and data) of the task can be saved or stored, and the task can be paused (e.g., the task is transitioned to a paused state as described below). In some examples, the resources allocated for the task can be freed. Then a next task can be retrieved, for example, from the paused state to a previously maintained state, and can be executed to process the data at an input of the next task and produce an output having a limited duration. Subsequently, the next tasked can be paused, internal states and data of the next task can be saved, and the process continues to another task.

The benefits of the step process (or step-based process) of a workflow can be described below. A workflow can be executed with limited resources or reduced resources because only one or a few tasks in the workflow operate (or run) at a same time and other tasks in the workflow are paused. The cost of operation can be reduced by pausing a workflow during high traffic time and/or expensive hours of day for using cloud services. For example, the workflow can be stopped at high traffic time, such as during heavy traffic on the internet. A workflow may be completely serialized, for example, executing a initial task at a time to process the entire media data (e.g., a movie) while other tasks in the workflow are not running, and moving to a next task to process the entire media data while other tasks in the workflow are not running. For example, the size of a step (or an amount of data to process in one step) can be the entire media data. Accordingly, the initial task (T1) can run or process the entire movie in one step. Tasks with various computational complexities can be executed on the same hardware. A step of a simpler task can be executed faster, while execution of a step of more complex tasks can take more time.

Aspects of the disclosure provide a chunk processing mode or the step model for functions and running tasks based on the step model described above. A chunk can refer to a unit of data processed in one step, such as 10 frames. Functions or corresponding tasks can be designed to support the chunk processing mode, for example, to process a certain amount of data.

Aspects of the disclosure describe a buffering function (e.g., a first-in-first-out (FIFO) function or an NBMP FIFO function). A buffer can be configured for the buffering function, for example, a FIFO buffer is configured for the FIFO function. In an embodiment, the buffering function (e.g., the FIFO function) can be defined to have the following properties. (i) A buffering length or size for example, defined by a configuration parameter, such as a single input and single output defined length or a FIFO length of a FIFO queue. (ii) The buffering function can support events, such as an empty event and a full event as described below. The empty event can be generated when the buffer (e.g., the FIFO queue) is empty (e.g., data stored in the buffer is read by or is provided to a corresponding task). The full event can be generated when the buffer (e.g., the FIFO queue) is full. In some examples, the buffering function (e.g., the FIFO function) can support an X % (or % X) event. X can be a configuration parameter, such as a value that is larger than 0 and smaller than or equal to 100. In an example, X is smaller than 100, and the X % event can be referred to as a partial full event. The X % event can be generated when the buffer (e.g., the FIFO queue) is X percent full. When the buffer is X % full, an event (or the X % event) can be generated. One or multiple values for X can be set as configuration parameters. A buffering task (e.g., a FIFO task) implementing the buffering function (e.g., the FIFO function) can have the same task lifecycle as described with reference to FIG. 4A, and detailed descriptions are omitted for purposes of brevity.

The benefits of the buffering function can be described below. The buffering function (e.g., the FIFO function) is a simple function that can be implemented in any suitable platform, providing a buffer or a queue (e.g., the FIFO queue) and including cache memory, random access memory, long term storage such as solid state and hard disks. Events (e.g., the empty event, the full event, the partial full event) can be generated based on emptiness, fullness and partial fullness of the buffer. Therefore the buffering task can inform the workflow manager (103) of a status of the buffering task efficiently.

According to aspects of the disclosure, a workflow can be converted to a step-enabled workflow (or a step-based workflow, a step-by-step workflow, a step-able workflow) by adding one or more buffering tasks (e.g., FIFO tasks) in the workflow. The step-enabled workflow can operate in the step mode operation. A buffering task can be inserted between two tasks. The two tasks can include a task A and a task B where an output of the task A is provided to an input of the task B.

Figure 2B:
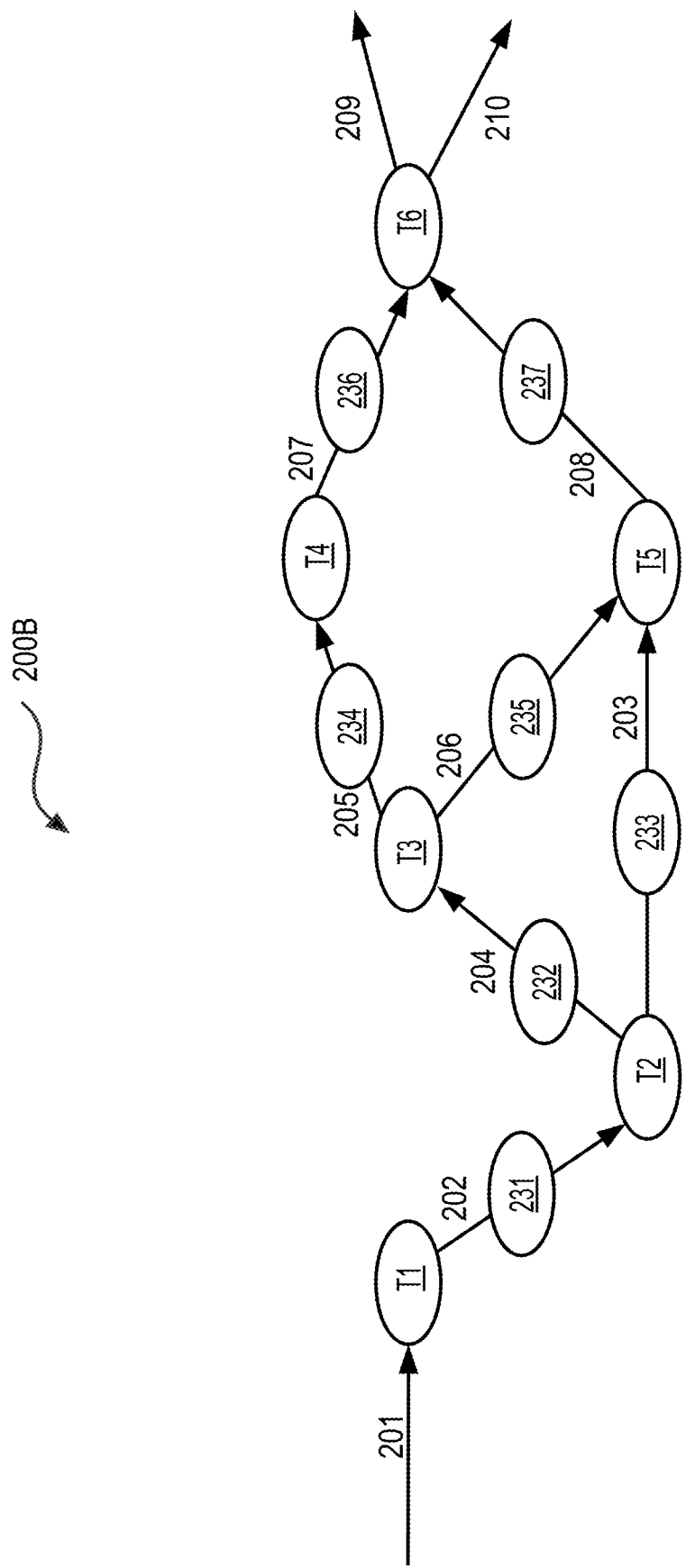

Referring to FIGS. 2A-2B, the workflow (200A) can be referred to as a regular workflow (200A). In an example, the regular workflow (200A) is not a step-based workflow. The regular workflow (200A) can be converted into a step-based workflow (e.g., a workflow (200B)) by inserting at least one buffering task into the regular workflow (200A). In general, a task in the step-based workflow can have a first number of input buffering tasks that provide data to be processed to the task and a second number of output buffering tasks that store data that is processed by the task. The first number can be any suitable non-negative integer, such as 0, 1, 2, or the like. The second number can be any suitable non-negative integer, such as 0, 1, 2, or the like. In some examples, such as shown in FIG. 2B, no buffering task is provided for each workflow input (e.g., (201)) to the step-based workflow. In some examples, at least one buffering task is provided for the workflow input(s) to the step-based workflow. In some examples, such as shown in FIG. 2B, no buffering task is provided for each workflow output (e.g., (209) or (210)) from the step-based workflow. In some examples, at least one buffering task is provided for the workflow output(s) from the step-based workflow.

In an example shown in FIG. 2B, buffering tasks (e.g., FIFO tasks) (231)-(237) are provided for the respective links (202)-(208), respectively. For example, the task (T1) is connected to a workflow input and is connected to no input buffering tasks. The task (T1) is connected to one output buffering task (231). The task (T2) is connected to one input buffering task (231), and two output buffering tasks (232)-(233). The task (T5) is connected to two input buffering tasks (233) and (235) and is connected to one output buffering task (237).

Each link (e.g., the link (202)) is a connection between two tasks (e.g., the tasks (T1)-(T2)) of the workflow (200B). The link (e.g., (202)) can represent data transfer from one (e.g., (T1)) of the two tasks to another (e.g., (T2)) of the two tasks. The buffering tasks (231)-(237) can be instantiated from the buffering function described above. In an example, the buffering tasks (231)-(237) include FIFO tasks that are instantiated from the FIFO function.

In general, a task pair (or two tasks) connected to a buffering task can include a "connect from" task and a "connect to" task for the buffering task. Referring to the buffering task (231) and the task pair (T1)-(T2) connected by the buffering task (231), the task (T1) is referred to as a "connect from" task and the task (T2) is referred to as a "connect to" task for the buffering task (231). The workflow (200B) includes seven task pairs corresponding to the seven buffering tasks (231)-(237).

Adding a buffering task between a task pair (including a "connect from" task and a "connect to" task) can allow the "connect from" task to run, generate an output, and fill a buffer configured for the buffering task while the "connect to" task is not running. The "connect from" task can run until the buffer is full or partial full (e.g., X % full) and the "connect from" task can have enough data for processing from buffer(s) connected to input(s) of the "connect from" task.

An amount of time that a task (e.g., (T1)) can run independently from other tasks (e.g., (T2)-(T6)) in the workflow (200B) can be defined by buffering tasks connected to input(s) and output(s) of the task. The buffering task(s) connected to the task input(s) can be referred to as the input buffering tasks (or input buffers), and the buffering task(s) connected to the task output(s) can be referred to as the output buffering task(s) (or output buffer(s)). In general, sizes of the buffers or the queues (or buffering lengths as described above) and the level of fullness (such as described by X %) can define a maximum size (or length) of a step (or a maximum step size) that the task can run. For example, when a buffer length is 10 frames, and the level of fullness is 80%, the maximum length of the step or the maximum step size is 8 frames.

In an example, for a task (e.g., (T2)) in the workflow (200B), when none of the input buffer(s) (e.g., (231)) of the task is empty and none of the output buffer(s) (e.g., (232)-(233)) of the task are full, the task (e.g., (T2)) can run independently from other tasks (e.g., (T1) and (T3)-(T6)) in the workflow (200B). In an example, when none of the input buffer(s) of the task is empty and none of the output buffer(s) of the task are X % full where X is a pre-configured value less than 100, the task (e.g., (T2)) can run independently from other tasks (e.g., (T1) and (T3)-(T6)) in the workflow (200B).

In an example, one or more tasks in a step-enabled workflow can run to process data while remaining tasks in the step-enabled workflow are not running Referring to FIG. 2B, if the buffering task (231) is omitted, the tasks (T1)-(T2) can run to process data simultaneously while the tasks (T3)-(T6) are not running and are in non-running states (e.g., paused states).

Advantages of converting a regular (non-step-based) workflow to a step-based workflow are described as below. The conversion is relatively simple and does not depend on the topology or complexity of the workflow, and thus can be performed in an unsupervised manner.

A buffer length of each buffering function or buffering task can be defined independently. Thus, buffer lengths of the buffering tasks in the workflow can be different. The step size for each task can be chosen differently. Thus, the step sizes of the tasks (T1)-(T6) in the workflow (200B) can be different.

Figure 3:
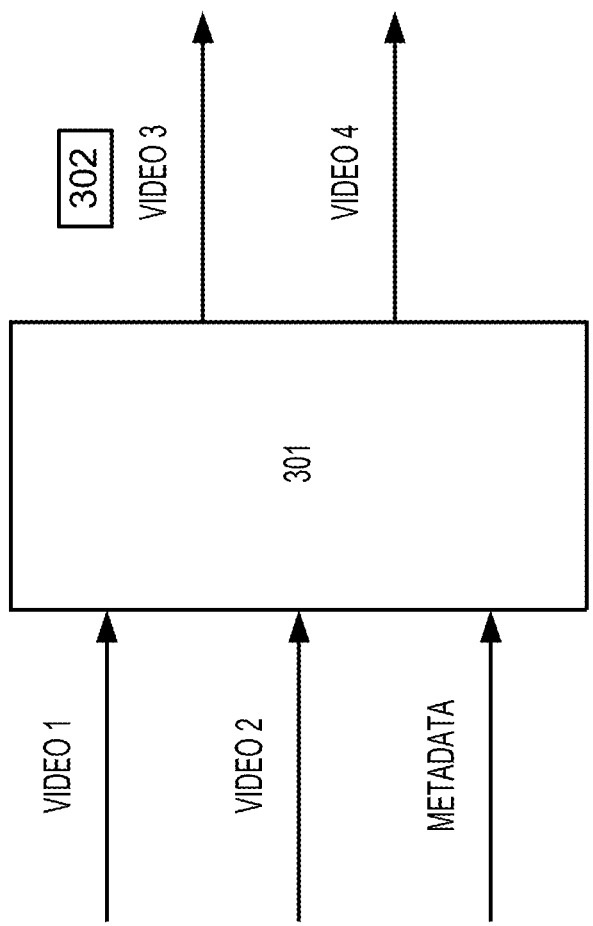
FIG. 3 shows an example of a task in a step-based workflow according to an embodiment of the disclosure.

FIG. 3 shows an example of a task (301) in a step-based workflow according to an embodiment of the disclosure. The task (301) can be instantiated from a corresponding function. In an example, media data to be processed by the workflow can include a plurality of subsets of media data. In one step, the task (301) can process one of the plurality of subsets of media data having a step size (302). In an example, when the task (301) processes the one of the plurality of subsets of media data, other tasks in the workflow are not running. In another example, when the task (301) processes the one of the plurality of subsets of media data, one or more other tasks in the workflow run at the same time while remaining tasks in the workflow are not running. The task (301) can process another one of the plurality of subsets of media data having the step size (302) in another step.

The task (301) can implement any suitable media processing method, such as video stitching. For example, a video 1 from a first camera and a video 2 from a second camera can be stitched by the task (301) based on metadata. The task (301) can output a video 3 that is a stitched video and a video 4. The video 4 can correspond to a different operation such as indexing. For the step-based workflow including the task (301) implemented in the step mode having the step size of 10 frames, 10 frames from the video 1 and 10 frames from the video 2 can be stitched in each step to output 10 frames of the video 3.

As described above with reference to FIG. 4A, a processing task or a task (e.g., a media processing task) can transition through different states. The different states in a task lifecycle can include the instantiated state (401), the idle state (402), the running state (403), the error state (404), the destroyed state (405), and/or the like.

Figure 5:
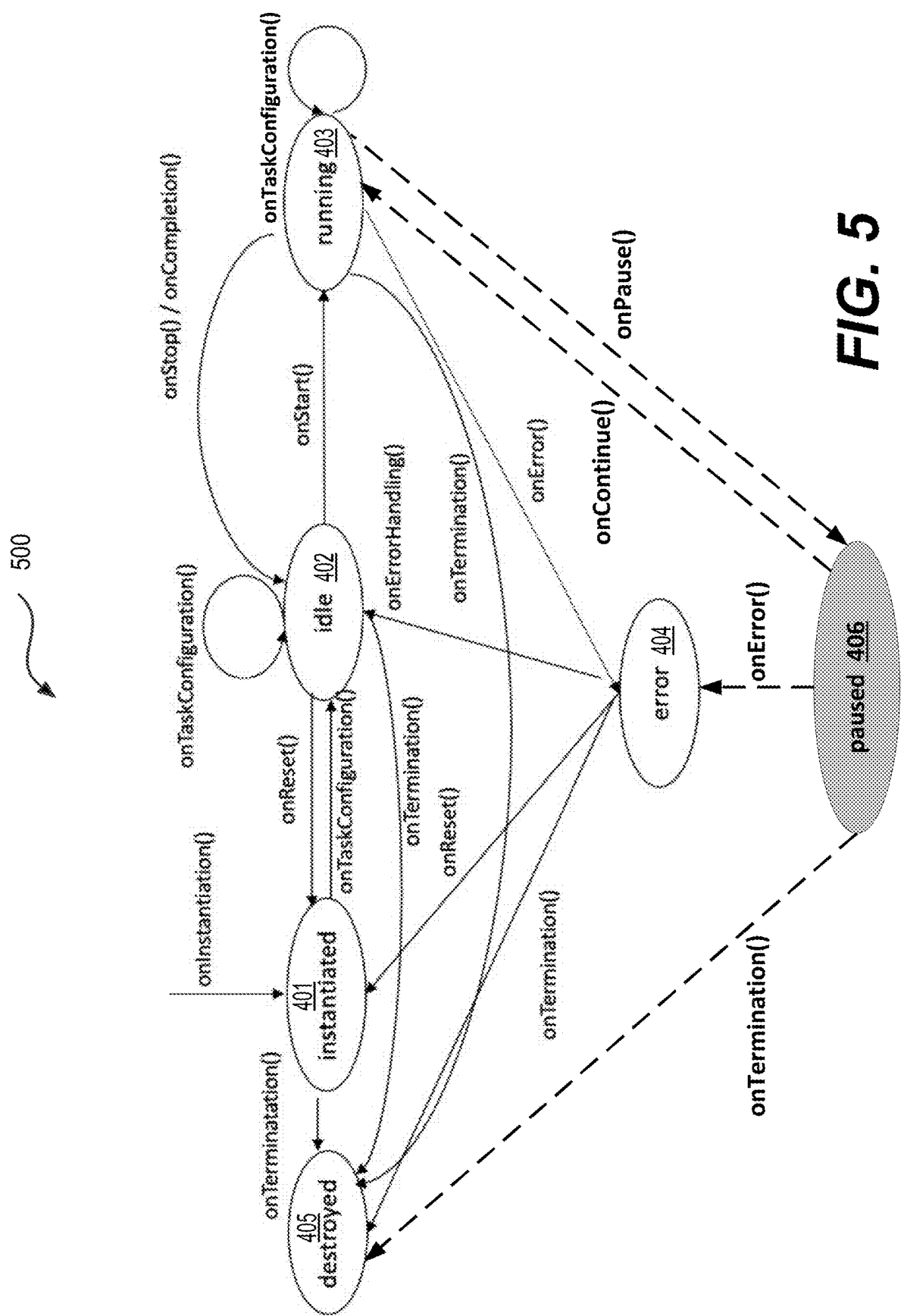
FIG. 5 shows an exemplary task lifecycle of a processing task according to an embodiment of the disclosure.

FIG. 5 shows an exemplary task lifecycle (500) of a processing task or a task (e.g., a media processing task) according to an embodiment of the disclosure. In an example, the task lifecycle (500) is an extended task lifecycle (e.g., an NBMP extended task lifecycle) (500). According to aspects of the disclosure, a paused state (406) (shown in grey) can be added to the extended task lifecycle (500). New transitions related to the paused state (406) are shown in dashed arrows.

In the paused state (406), the task can stop any operation, accept no input, and generate no output. Further, in the paused state (406), the task maintains (e.g., stores) state information (e.g., internal state(s) and memory) of the task. In general, the task that is in the paused state (406) can transition to other states, such as the running state (403), the error state (404), and the destroyed state (405). The task can change a state from the running state (403) to the paused state (406) (e.g., with onPause transition). The task can change a state from the paused state (406) to the running state (403) (e.g., with OnContinue transition). When an error occurs while the task is in the paused state (406), the task state can be changed to the error state (404) (e.g., with OnError transition). The task in the paused state (406) can be changed to the destroyed state (e.g., with onTermination transition).

The benefit of extending the task lifecycle (400) to the extended task lifecycle (500) is that: one additional state (the paused state) with limited transitions (four transitions indicated by the dashed arrows in FIG. 5) is added, and thus no significant complexity is added.

Figure 6:
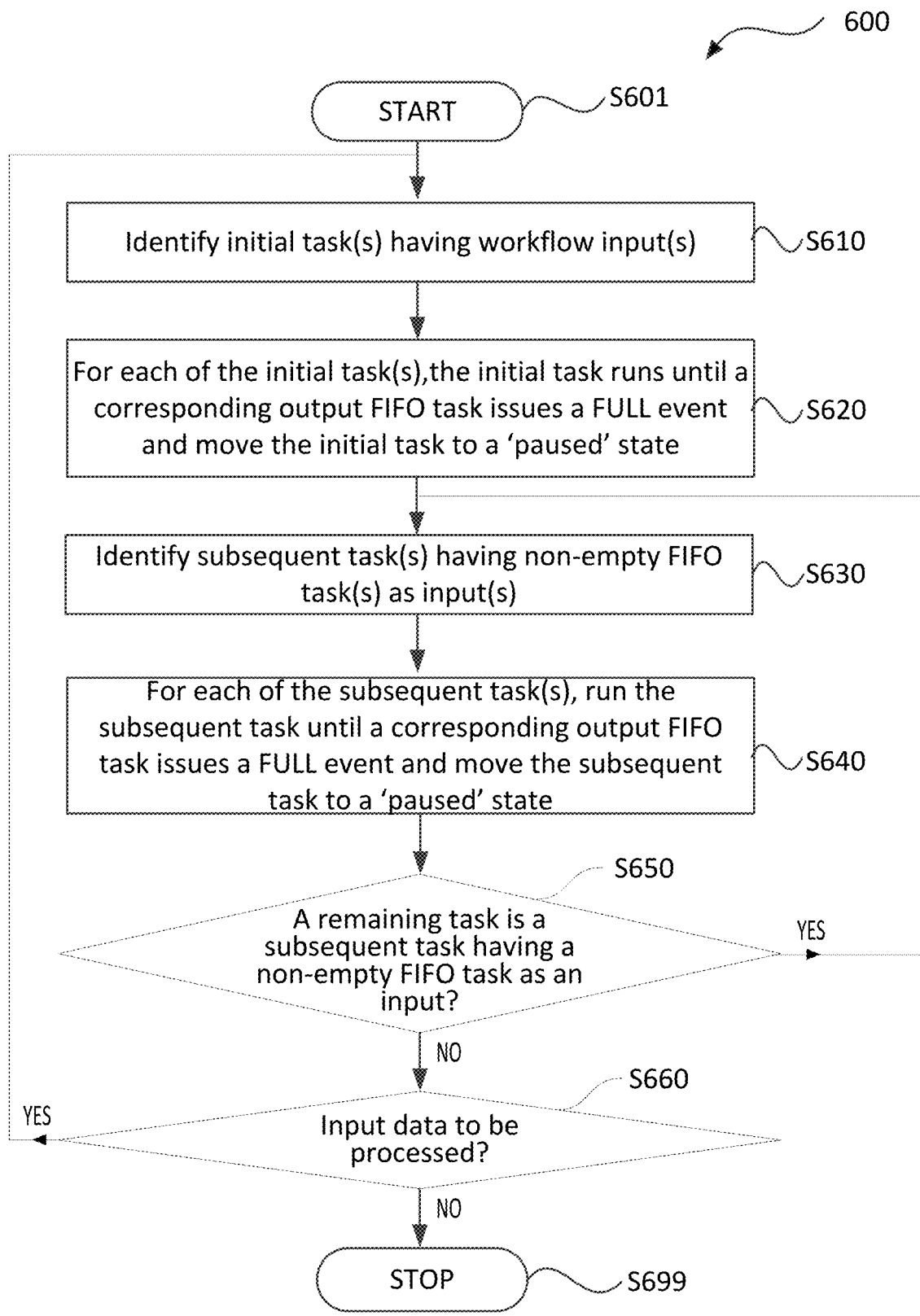
FIG. 6 shows a flow chart outlining a process according to an embodiment of the disclosure.

FIG. 6 shows a flow chart outlining a process (600) according to an embodiment of the disclosure. The process (600) can be applied to operations of any suitable step-enabled workflow having any suitable number of workflow input(s) and any suitable number of workflow output(s). The step-enabled workflow can include any suitable number of processing tasks and any suitable links (or connections) connecting two of the tasks. The step-enabled workflow can include buffering task(s) (e.g., FIFO task(s)) and the buffering task(s) can be provided at the respective links. Step sizes of processing tasks in the step-enabled workflow can be determined by the buffering task(s).

In an example, the step-enabled workflow is the workflow (200B). Each of the tasks (T1)-(T6) can have the task lifecycle (500), the different states (401)-(406), and the corresponding transitions described with reference to FIG. 5. In an example, the step-enabled workflow (200B) is in the idle state (412) and the buffers (e.g., the FIFO buffers or the FIFO queues) for the buffering tasks (e.g., the FIFO tasks) (231)-(237) are empty. In an example, input data (e.g., media data) to be processed includes 1000 frames. A step size is 10 frames. Thus, the input data is divided into a plurality of subsets of the input data where a size of each subset is 10 frames.

The step by step (or step based, step-enabled) operation of the workflow (200B) can be implemented as described below. Any suitable data processing system (e.g., an NBMP system) can implement the step by step operation of the workflow (200B). The description below is given for the data processing system (100) and can be suitably adapted to any suitable data processing system (e.g., an NBMP system).

At (S610), initial task(s) can be identified, for example, by the workflow manager (103). Input(s) of each of the initial task(s) can be workflow input(s). For example, all the input(s) of the initial task(s) are connected to the data source (e.g., the media source) (111). The initial task(s) can be labeled as Ti0, Ti1, . . . , TiN where N is a non-negative integer. Referring to FIG. 2B, the initial task(s) identified in the workflow (200B) include the task (T1) where Ti0 is (T1) and N is 0.

At (S620), for the identified initial task(s), Ti0 can start running to process a subset (e.g., 10 frames) of the input data followed by Ti1, . . . , TiN. For each of the initial task(s), the initial task can run, for example, one step until a corresponding output buffer (e.g., FIFO queue) of the respective buffering task (e.g., FIFO task) is full. Here, the initial task is (T1).

The workflow manager (103) can send a request to (T1) and move the task (T1) to the running state (403).

(T1) can run, for example, to process 10 frames of the input data (e.g., media data) and fill in the output buffering task (231), for example, up to a first threshold. When an amount of data stored in the output buffer is equal to the first threshold, the output buffering task can generate an event and send a notification to the workflow manager (103). When the output buffering task (231) is X % full, the output buffering task (231) can issue or generate an X % FULL event and send the notification of the X % full event to the workflow manager (103). The first threshold can be determined based on the buffer length and the parameter X. For example, the buffer length is 20 frames and X is 50, then the first threshold is 10 frames. The step sizes of the processing tasks can be determined based on thresholds for the buffering task(s).

As described above, the X % full can indicate that the output buffering task (231) is completely full or partially full where X is less than or equal to 100. In an example, when the output buffering task (231) is completely full (e.g., X=100), the output buffering task (231) can issue a FULL event and send a notification to the workflow manager (103). In another example, when the output buffering task (231) is partially full (e.g., X is less than 100), the output buffering task (231) can issue a partially FULL event and send a notification to the workflow manager (103). The FULL event and the partially FULL can be identical or can be different. In an example, the partially FULL event is identical to the FULL event, and thus when the output buffering task (231) is X % full, the FULL event is generated.

The workflow manager (103) can send a request to the task (T1), moving the task (T1) to the paused state (406) from the running state (403). In the pause state (406), the state information (e.g., the status and values of the internal functions) of the task (T1) can be maintained (e.g., stored).

(S620) can be repeated for each of the initial task(s). The above description for (T1) can be suitably adapted for other initial task(s).

At (S630), the workflow manager (103) can identify subsequent task(s) where all inputs of the subsequent task(s) are connected to non-empty buffering task(s) (e.g., FIFO tasks). The subsequent task(s) can be labeled as Tj0, Tj1, . . . , TjM where M is a non-negative number. Referring to FIG. 2B, the non-empty buffering task(s) include the buffering task (231) that stores the subset of the input data that is processed by the task (T1). The subsequent task(s) identified at (S630) includes (T2), and thus Tj0=(T2) and M is 0.

At (S640), for the identified subsequent task(s), Tj0 can start running to further process the subset of the input data followed by Tj1, . . . , TjM. For each of the subsequent task(s), the subsequent task can run until a corresponding output buffering task (e.g., FIFO queue of the respective FIFO task) is full. Here, the subsequent task is (T2).

The workflow manager (103) can send a request to (T2) and cause the task (T2) to transition to the running state (403).

(T2) can run, for example, to further process the 10 frames that are processed by (T1) and fill in the output buffering task(s) (e.g., (232)-(233)), for example, up to a second threshold.

When one (e.g., (232) or (233)) of the output buffering tasks is X % full, the one of the output buffering tasks can issue or generate a X % FULL event and send a notification of the X % full event to the workflow manager (103), as described above.

The workflow manager (103) can send a request to the task (T2), causing the task (T2) to transition to the paused state (406) from the running state (403). In the pause state (406), the internal information (e.g., the status and values of the internal functions) of the task (T2) can be maintained.

(S640) can be repeated for each of the subsequent task(s). The above description for (T2) can be suitably adapted for other subsequent task(s).

At (S650), whether a remaining task to be processed is a subsequent task can be determined. As described above, all input(s) of the subsequent task are non-empty buffering tasks. When the remaining task is determined to be the subsequent task, the process (600) returns to (S630), and thus (S630) and (S640) are repeated for the newly identified subsequent task(s). When no remaining task is determined to be the subsequent task, the process (600) proceeds to (S660).

For example, the task (T3) is the newly identified subsequent task, and (S640) is repeated for the task (T3). Subsequently, (S650) and (S630) are repeated, and thus the tasks (T4)-(T5) are identified as the new subsequent tasks, and (S640) is repeated for (T4)-(T5). Finally, (T6) is identified, and (S640) is repeated for (T6).

In general, (S630) and (S640) can be repeated for remaining subsequent task(s) having input(s) connected to non-empty buffering task(s) until all tasks in the workflow (200B) run, for example, to process the 10 frames. Thus, no remaining task is determined to be the subsequent task, the process (600) proceeds to (S660).

At (S660), whether the input data remain to be processed is determined. When no input data are determined to be processed, the process (600) proceeds to (S699) and terminates. When input data are determined to be processed, the process (600) returns to (S610) and repeat (S610), (S620), (S630), (S640), and (S650) for another subset (e.g., another 10 frames) of the input data.

The process (600) can be suitably adapted. Step(s) in the process (600) can be modified and/or omitted. Additional step(s) can be added. Any suitable order of implementation can be used. In an example described above, in one step, when one task runs, other tasks in the workflow (200B) are not running (e.g., in the paused state (406)). In another example, one or more tasks can run simultaneously in a step while other tasks in the workflow are not running (e.g., in the paused state (406)). A task in the workflow (200B) can run in one step and then transition to the paused state (406). Subsequently, another task can run in another step. Alternatively, a task in the workflow (200B) can run in consecutive steps before transitioning into the paused state (406).

The benefits of the process (600) and/or the step-by-step workflow (200B) can be described as below. The logic is simple for the data processing system (e.g., the NBMP system) (100) (e.g., the workflow manager (103)) to execute the process (600). A propagation model can start from the workflow input(s) and execute one step of each task, followed by task(s) connected to output(s) of the task. The process (600) and/or the workflow (200B) can generate the output(s) of workflow in a plurality of steps. The steps can be triggered by events and therefore the workflow management can be very efficient.

As illustrated in FIG. 5, the paused state (406) can be added to data processing operations (e.g., NBMP operations). For example, a general descriptor has a state parameter to describe a state of a task. The state parameter can use a value "paused" or "pause" to describe the paused state (406).

To set a task in the paused state (406), the workflow manager (103) can use CreateTask or UpdateTask, with the state parameter set to "pause" or "paused". If the task is running (e.g., in the running state (403)), the task can go to the paused state (406). If the task is not running (e.g., in the idle state (402)), the task can, for example, go from the idle state (402) to the running state (403) and then transition from the running state (403) to the paused state (406).

The paused state (406) can be managed by a cloud platform and thus a cloud resource manager can store the internal state(s) and data of the task, for example, when the task is in the paused state (406).

In an example, a paused state is added to a workflow lifecycle of a workflow. Different states in the workflow lifecycle can include the instantiated state (411), the idle state (412), the running state (413), the error state (414), and the destroyed state (415) as described in FIG. 4B. Further, the different states can include the paused state. In an example, the workflow transitions between the paused state and one of the running state (413), the error state (414), and the destroyed state (415). In an example, state information of the workflow can be stored when the workflow is in the paused state.

A buffer length (e.g., a FIFO length) can be determined as described below. The buffer length is a configuration parameter of the buffering function. In an example, the buffer length is the only configuration parameter of the buffering function. If the buffer length is zero, two tasks connected through a buffering task corresponding to the buffering function cannot operate in the step mode. In an example, when the buffer length is zero, the two tasks connected through the FIFO task operates simultaneously or in a continuous mode. If the buffer length is infinite, a task connected to the buffering task can operate in a first step, completely processing data in the first step. Then another task connected from the buffering task can operate in a second step.

In various examples, the buffer length varies between zero and being infinite. The choice of the buffer length can depend on various factors, including the functionality of each task, the granularity of data processing in each task, the minimum adequate size of an input of a task to generate an output, the availability of memory, storage, and/or buffers in underlying system deploying a workflow and tasks in the workflow, and/or the like.

The above design of a step-based workflow can be applied to an entire workflow, e.g., the workflow can be executed step-by-step by implementing buffering tasks at workflow input(s) and/or workflow output(s). The benefit of the above approach is that while individual tasks of the workflow may not be step-enabled, the workflows can be processed in steps. Therefore, the workflow can be executed step-by-step. Thus, when the platform resources are not available continuously to execute the entire session in one step, one or more workflows can run while remaining workflows are not running (e.g., in a paused state). When the workflow is a part of multi-workflow setup and each workflow can be executed step-by-step, not all workflows are running at the same time.

Figure 2C:
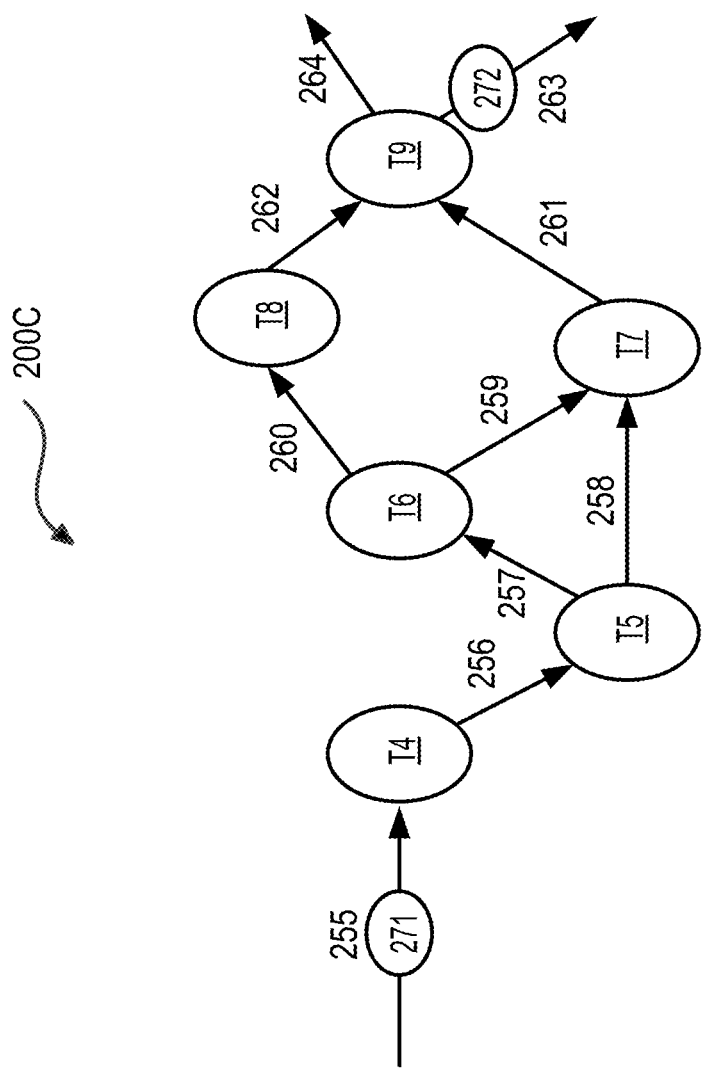

FIG. 2C shows an example of a workflow (200C) according to an embodiment of the disclosure. The workflow (200C) includes processing tasks (or tasks) (T4)-(T9). In an example, no buffering tasks are inserted between two of the processing tasks (T4)-(T9), and the processing tasks (T4)-(T9) can run simultaneously to process data and are not step-enabled. One or more buffering tasks can be inserted to workflow input(s) and/or workflow output(s), and thus the workflow (200C) can run in the step mode or one step at a time. A step size can be determined based on a buffer length and X as defined in the X % fullness. In an example, a buffering task (271) is provided at a workflow input (255), and a buffering task (272) is provided at a workflow output (263). In an example, the workflow (200C) runs to process data until one of the conditions is satisfied: (i) data stored in the buffering task (271) is provided to the workflow (200C) (e.g., the buffering task (271) is empty), and (ii) an amount of data stored in the buffering task (272) is equal to a threshold set for the buffering task (272). The threshold can be determined based on the buffer length and the parameter X. In an example, the step size matches the threshold. The above description to the workflow (200C) can be suitably adapted when the workflow includes step-enabled task(s).

Figure 2D:
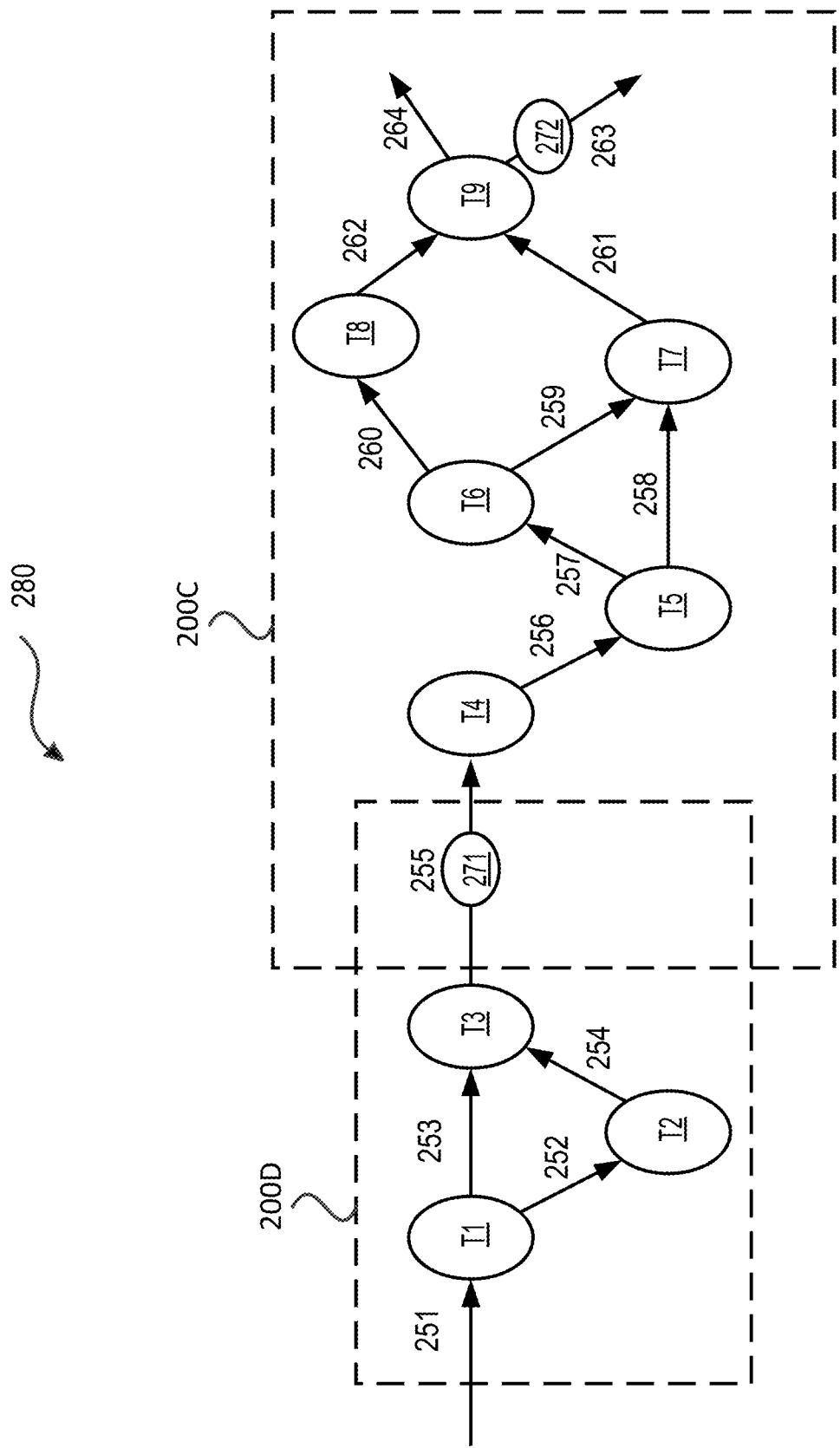
FIG. 2D shows an example of a plurality of workflows according to an embodiment of the disclosure.

FIG. 2D shows an example of a plurality of workflows (280) according to an embodiment of the disclosure. The plurality of workflows (280) can include a cascade of workflows having the workflow (200C) and a workflow (200D). The workflow (200C) is described in FIG. 2C. The workflow (200D) includes processing tasks (T1)-(T3) with a workflow input (251) providing input data to the task (T1) and a workflow output (255) providing input data to the workflow (200C). Thus, the workflow output (255) of the workflow (200D) is the workflow input (255) of the workflow (200C).

The buffering task (271) is inserted between the workflows (200C) and (200D), and thus the plurality of workflows (280) runs in the step mode where the workflow (200D) runs to process data while the workflow (200C) is in a non-running state and does not run to process data.

A workflow can run in the step mode when a buffering task is provided at a workflow input or a workflow output. A step size that the workflow can run (or a task in the workflow can run) can be determined based on the threshold, for example, a maximum amount of data that can be stored in the buffer configured for the buffering task. The threshold can be determined based on the buffer length and the parameter X in the X %.

According to aspects of the disclosure, a regular workflow (or a non-step-enabled workflow) including non-step-able tasks can be converted to a step-able workflow including step-able task(s) by using a simple buffering function (or buffering task). The buffering function or task can be efficient to implement in all suitable platforms. Selection of a buffer length for each buffering task can be flexible, and thus a step size for each task can be designed with high flexibility. The event (e.g., the Full event) driven step process can simplify design and make the management of a workflow efficient. A workflow algorithm for propagating the workflow through one step per task execution is simple. The output(s) of workflow can be generated in steps. Extension from the task lifecycle (400) to the extended task lifecycle (500) is minimal and therefore the added complexity due to the extension is minimal. While buffering length is used as an example for the configuration of a buffer task, other units may be utilized.

According to aspects of the disclosure, a workflow can run in the step mode when a buffering task is provided for a workflow input, a workflow output, or between two tasks in the workflow. The workflow can run step-by-step, and thus the workflow does not run continuously to process data (e.g., media data) as the data is input to the workflow. Instead, the workflow can process a first subset of the data in a first step. After outputting the processed first subset of the data, the workflow can process a second subset of the data in a second step. A step size that the workflow can run (or a task in the workflow can run) to process data in each step can be determined based on the threshold, for example, a maximum amount of data that can be stored in the buffer configured for the buffering task. The threshold can be determined based on the buffer length and the parameter X in the X %.

The step-by-step workflow can be achieved using any suitable method. In an example, the workflow can include buffering task(s) (e.g., FIFO task(s)) provided between tasks in the workflow, as shown in FIG. 2B. One or more tasks in the workflow can run in running state(s) at a same time while other tasks are in non-running state(s) (e.g., the paused state(s)), thus reducing resources (e.g., computational resources, memory resources) used in running all the tasks simultaneously.

According to aspects of the disclosure, workflow information of the workflow can be received by processing circuitry. Based on the workflow information, the workflow can be generated to process input data. The workflow can include a plurality of processing tasks and a first buffering task. The plurality of processing tasks can include a first processing task and a second processing task. The first processing task can be caused to enter a running state (403) in which a subset of the input data is processed by the first processing task and output to the first buffering task as first processed subset data. In an example, subsequently, the first processing task can be caused to transition from the running state (403) to a paused state (406) based on an amount of the first processed subset data stored in the first buffering task being equal to a first threshold. State information of the first processing task can be stored in the paused state (406). After the first processing task is transitioned to the paused state (406), the second processing task can be caused to enter a running state (403) in which the first processed subset data stored in the first buffering task is processed by the second processing task. In an example, the subset of the input data is one of a plurality of subsets of the input data.

In an embodiment, the second processing task that is in the running state can output the processed first processed subset data as second processed subset data to a second buffering task. Further, the second processing task can be caused to transition from the running state to a paused state based on one of: (i) an amount of the second processed subset data stored in the second buffering task being equal to a second threshold and (ii) the amount of the first processed subset data stored in the first buffering task being provided to the second processing task. State information of the second processing task can be stored in the paused state.

The first buffering task can be configured to generate an event indicating that the amount of the first processed subset data stored in the first buffering task is equal to the first threshold. In an example, the first buffering task is a FIFO task configured with a FIFO buffer. A FIFO length can be equal to or larger than the first threshold. The FIFO task can be configured to generate the event (e.g., the full event) indicating that the amount of the first processed subset data stored in the FIFO task is equal to the first threshold. The FIFO task can be configured to generate another event (e.g., the empty event) indicating that the amount of the first processed subset data stored in the FIFO task is provided to the second processing task.

In an embodiment, the workflow includes a plurality of buffering tasks that includes the first buffering task. Each input of the plurality of processing tasks is from one of the input data and one or more of the plurality of buffering tasks, and only one of the plurality of the processing tasks is allowed to be in the running state at any point in time. In an example, the input data includes the subset of the input data and another subset of the input data. The subset of the input data can be sequentially processed by the plurality of processing tasks. After the subset of the input data is processed by the plurality of processing tasks, the other subset of the input data can be sequentially processed by the plurality of processing tasks while remaining processing tasks in the plurality of processing tasks are in the paused states.

In another example, no buffering tasks are provided between the tasks in the workflow. Instead, buffering task(s) are provided to workflow input(s) and workflow output(s) of the workflow, as shown in FIGS. 2C-2D. Thus, the workflow can run step-by-step, and may occupy resources for a relatively short time (e.g., a time for running a step) and can free up resources (e.g., computational resources, memory resources) for other workflows/tasks with higher priorities between steps.

According to aspects of the disclosure, workflow information of a plurality of workflows can be received by the processing circuitry. Based on the workflow information, the plurality of workflows can be generated to process input data. At least one of the plurality of workflows includes a plurality of processing tasks. The plurality of workflows can include a first workflow and a second workflow. The first workflow can be caused to enter a running state (403) in which a subset of the input data is processed by the first workflow and output to the buffering task as first processed subset data. The first workflow can be caused to transition from the running state (403) to a paused state (406) based on an amount of the first processed subset data stored in the buffering task being equal to a threshold. State information of the first workflow can be stored in the paused state (406). After the first workflow is transitioned to the pause state (406), the second workflow can be caused to enter a running state (403) in which the first processed subset data stored in the buffering task is processed by the second workflow. In an example, the subset of the input data is one of a plurality of subsets of the input data. The above descriptions for the first buffering task can be applied to the buffering task, and thus detailed descriptions are omitted for purposes for brevity.

The step size can vary, for example, based on properties of the buffering tasks. In an example, the step size is equal to or larger than a length of the entire data to be processed, and thus one step is used for the workflow or for each task. Alternatively, the data can be divided into chunks (e.g., a plurality of subsets of data) and multiple steps are executed to process the data in chunks.

A NBMP FIFO function can use FIFO buffer operation. The FIFO function can issue events when the FIFO buffer is empty, full, or partial full.

In an embodiment, a regular or non-step-enabled workflow can be converted to a step-enabled workflow (e.g., the workflow (200B)) using the buffering function (e.g., the NBMP FIFO function) or the buffering task (e.g., the FIFO task). The step-able workflow can enable each task in the step-able workflow to be executed in one step at a time while other tasks in the step-able workflow are in the 'paused' state (406). When in the paused state (406), the other tasks are sleeping. For example, each of the other tasks stops operations, accepts no input, and generates no output, and maintains state information (e.g., respective internal information) for the task in the paused state (406).

The workflow can be operated in a multi-stage process in steps by executing one task at a time and step by step, thus the workflow can process the data and produce outputs in steps. The processed data can be stored in buffers configured for buffering tasks for further processing at a next stage. Therefore, data can be moved in steps through the tasks in the workflow and the outputs of the workflow can be generated in steps.

The extended task lifecycle (500) includes the paused state that enables preserving the internal states and data of a task. While the task is in the paused state, the internal states and data of the task are preserved. The internal states and the data of the task can be used in next steps The set of new operations for managing a task having the extended task lifecycle (500) can enable changing a state of each task to the paused state or changing from the paused state to another state.

A workflow in a cascade of workflows can include buffering tasks in workflow input(s) and workflow output(s), and thus the workflow can be processed in steps.

Figure 7:
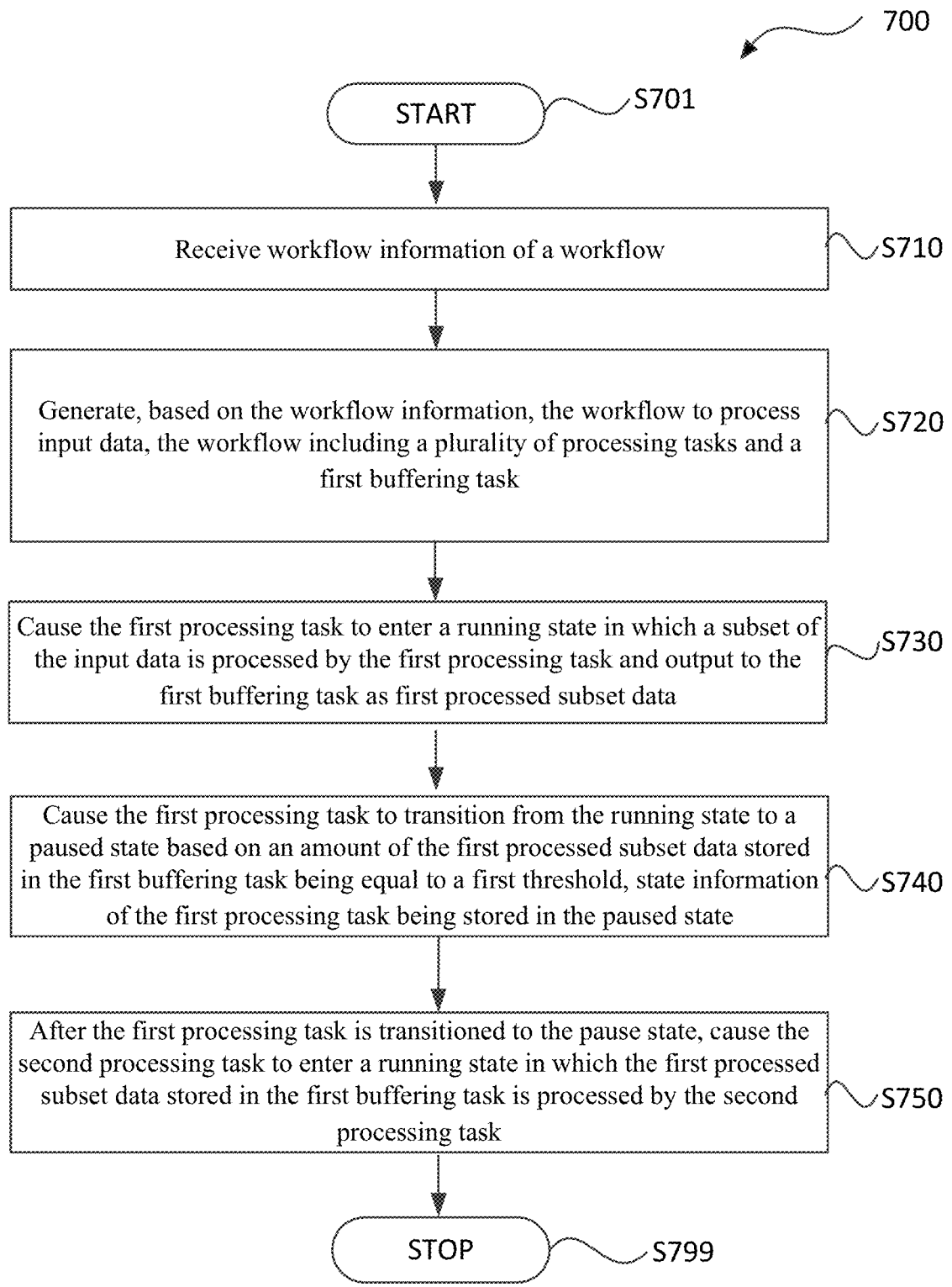
FIG. 7 shows a flow chart outlining a process according to an embodiment of the disclosure.

FIG. 7 shows a flow chart outlining a process (700) according to an embodiment of the disclosure. In an example, the process (700) is implemented using the data processing system (e.g., the NBMP system) (100) to process input data, such as media data. In some embodiments, the process (700) is implemented in software instructions, thus when the processing circuitry executes the software instructions, the processing circuitry performs the process (700). The process starts at (S701) and proceeds to (S710).

At (S710), workflow information of a workflow can be received by processing circuitry. In an example, the workflow information is received by a workflow manager (e.g., the workflow manager (103) from a data processing source (e.g., the NBMP source (101)).

At (S720), based on the workflow information, the workflow to process input data can be generated. The workflow can include a plurality of processing tasks and a first buffering task. The plurality of processing tasks can include a first processing task and a second processing task. The workflow is a step-enabled workflow, such as described in FIG. 2B. The first buffering task can be instantiated from a corresponding buffering function as described above. In an example, the input data includes a plurality of subsets of the input data having a subset of the input data. In an example, a size of each subset of the input data corresponds to the first threshold.

At (S730), the first processing task can be caused to enter a running state in which the subset of the input data is processed by the first processing task and output to the first buffering task as first processed subset data. In an example, when the first processing task is in the running state to process the subset of the input data, the second processing task is in a non-running state (e.g., a paused state), as described above. The first buffering task can be configured to store the first processed subset data and provide the first processed subset data to the second processing task.

At (S740), the first processing task can be caused to transition from the running state to a paused state based on an amount of the first processed subset data stored in the first buffering task being equal to a first threshold. State information of the first processing task can be stored in the paused state.

In an example, when the amount of the first processed subset data stored in the first buffering task is equal to the first threshold, an event (e.g., the FULL event, the X % event described above) can be generated, for example, by the first buffering task and a notification can be sent to the workflow manager. Subsequently, the workflow manager can send a request to the first processing task and cause the first processing task to transition from the running state to the paused state.

In an example, when a buffering task (referred to as an input buffering task) provides an input to the first processing task and data stored in the buffering task is provided to the first processing task, the first processing task can be caused to transition from the running state to the paused state. For example, the buffering task can generate the empty event when the data stored in the buffering task is provided to the first processing task, and a notification can be sent to the workflow manager. Subsequently, the workflow manager can send a request to the first processing task and cause the first processing task to transition from the running state to the paused state.

In an example, when the data stored in the input buffering task is provided to the first processing task or the amount of the first processed subset data stored in the first buffering task is equal to the first threshold, the first processing task can be caused to transition from the running state to the paused state.

At (S750), after the first processing task is transitioned to the pause state, the second processing task can be caused to enter a running state in which the first processed subset data stored in the first buffering task is processed by the second processing task. In an example, the first processing task is in the paused state while the second processing task runs to process the first processed subset data. Thus, the first processing task and the second processing task do not run simultaneously, and run sequentially.

The process (700) can be suitably adapted. Step(s) in the process (700) can be modified and/or omitted. Additional step(s) can be added. Any suitable order of implementation can be used.

In an example, the second processing task that is in the running state outputs the processed first processed subset data as second processed subset data to a second buffering task. The second buffering task can be configured to store the second processed subset data and provide the second processed subset data to a third processing task in the plurality of processing tasks. After (S750), the second processing task can be caused to transition from the running state to a paused state based on one of: (i) an amount of the second processed subset data stored in the second buffering task being equal to a second threshold and (ii) the amount of the first processed subset data stored in the first buffering task being provided to the second processing task (e.g., the buffer configured for the first buffering task is empty). State information of the second processing task can be stored in the paused state.

Figure 8:
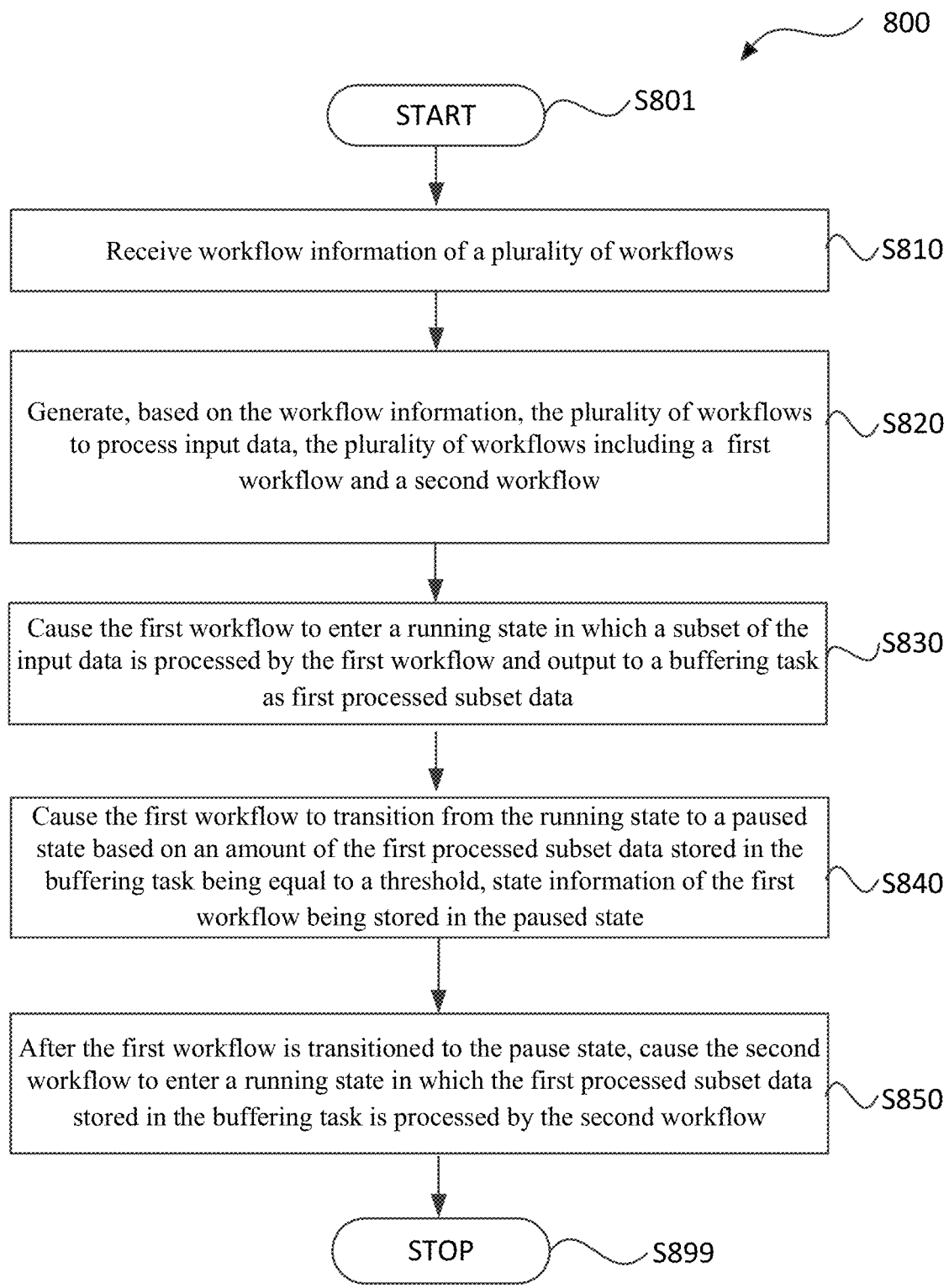
FIG. 8 shows a flow chart outlining a process according to an embodiment of the disclosure.

FIG. 8 shows a flow chart outlining a process (800) according to an embodiment of the disclosure. In an example, the process (800) is implemented using the data processing system (e.g., the NBMP system) (100) to process input data, such as media data. In some embodiments, the process (800) is implemented in software instructions, thus when the processing circuitry executes the software instructions, the processing circuitry performs the process (800). The process starts at (S801) and proceeds to (S810).

At (S810), workflow information of a plurality of workflows can be received by processing circuitry. In an example, the workflow information is received by a workflow manager (e.g., the workflow manager (103) from a data processing source (e.g., the NBMP source (101)).

At (S820), based on the workflow information, the plurality of workflows to process input data can be generated. At least one of the plurality of workflows can include a plurality of processing tasks. The plurality of workflows can include a first workflow and a second workflow. At least one of the first workflow and the second workflow has an input buffering task or an output buffering task as described above in FIG. 2C.

At (S830), the first workflow can be caused to enter a running state in which a subset of the input data is processed by the first workflow and output to a buffering task as first processed subset data. In an example, when the first workflow is in the running state to process the subset of the input data, the second workflow is in a non-running state (e.g., a paused state), as described above. In an example, the buffering task can be configured to store the first processed subset data and provide the first processed subset data to to the second workflow. The buffering task can be instantiated from a corresponding buffering function as described above.

At (S840), the first workflow can be caused to transition from the running state to a paused state based on an amount of the first processed subset data stored in the buffering task being equal to a threshold. State information of the first workflow can be stored in the paused state.

In an example, when the amount of the first processed subset data stored in the buffering task is equal to the threshold, an event (e.g., the FULL event, the X % event described above) can be generated, for example, by the buffering task and a notification can be sent to the workflow manager. Subsequently, the workflow manager can send a request to the first workflow and cause the first workflow to transition from the running state to the paused state.

In an example, when a buffering task (referred to as an input buffering task) provides an input to the first workflow and data stored in the input buffering task is provided to the first workflow, the first workflow can be caused to transition from the running state to the paused state. For example, the input buffering task can generate the empty event when the data stored in the input buffering task is provided to the first workflow, and a notification can be sent to the workflow manager. Subsequently, the workflow manager can send a request to the first workflow and cause the first workflow to transition from the running state to the paused state.

In an example, when the data stored in the input buffering task is provided to the first workflow or the amount of the first processed subset data stored in the buffering task (or the output buffering task) is equal to the threshold, the first workflow can be caused to transition from the running state to the paused state.

At (S850), after the first workflow is transitioned to the pause state, the second workflow can be caused to enter a running state in which the first processed subset data stored in the buffering task is processed by the second workflow. In an example, the first workflow is in the paused state while the second workflow runs to process the first processed subset data. Thus, the first workflow and the second workflow do not run simultaneously, and run sequentially.

The process (800) can be suitably adapted. Step(s) in the process (800) can be modified and/or omitted. Additional step(s) can be added. Any suitable order of implementation can be used.

The techniques described above, can be implemented as computer software using computer-readable instructions and physically stored in one or more computer-readable media.

The methods and embodiments in the disclosure may be used separately or combined in any order. Further, each of the methods (or embodiments), functions or tasks, may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
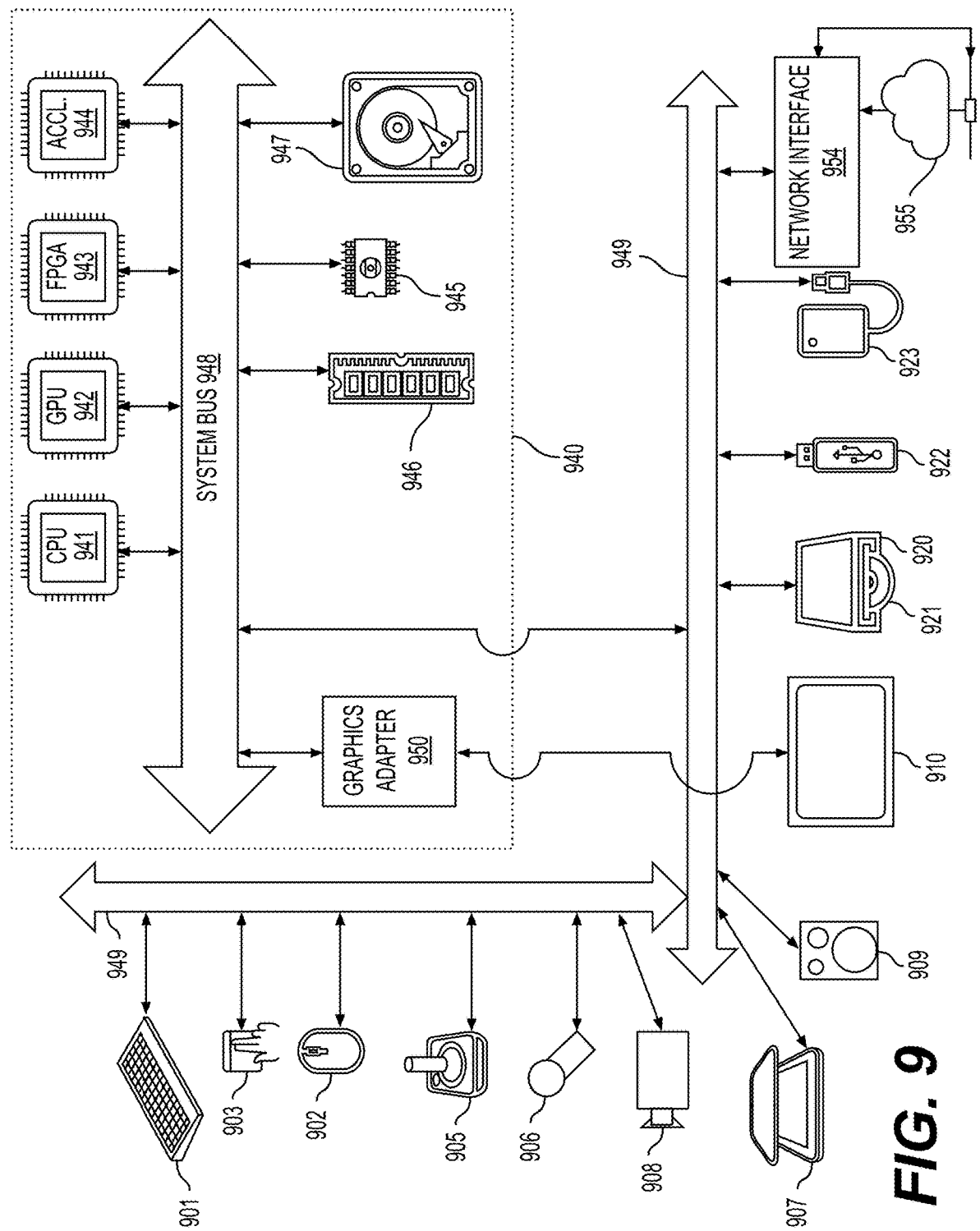
FIG. 9 shows a schematic illustration of a computer system in accordance with an embodiment.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for processing a workflow, the method comprising:
  receiving, by processing circuitry, workflow information of the workflow;
  generating, based on the workflow information, the workflow to process input data, the workflow including a plurality of processing tasks and a plurality of buffering tasks, the plurality of processing tasks including a first processing task, a second processing task, and a third processing task, the plurality of buffering tasks including a first buffering task and a second buffering task; and
  sequentially processing, by the plurality of processing tasks, a subset of the input data by
    causing the first processing task to enter a first running state in which the subset of the input data is processed by the first processing task and output to the first buffering task as first processed subset data;
    causing the first processing task to transition from the first running state to a first paused state based on an amount of the first processed subset data stored in the first buffering task being equal to a first threshold, state information of the first processing task being stored in the first paused state;
    after the first processing task is transitioned to the first paused state, causing the second processing task to enter a second running state in which the first processed subset data stored in the first buffering task is processed by the second processing task and output to the second buffering task as second processed subset data;
causing the second processing task to transition from the second running state to a second paused state based on one of (i) an amount of the second processed subset data stored in the second buffering task being equal to a second threshold and (ii) the amount of the first processed subset data stored in the first buffering task being provided to the second processing task, state information of the second processing task being stored in the second paused state; and
after the second processing task is transitioned to the second paused state, causing the third processing task to enter a third running state in which the second processed subset data stored in the second buffering task is processed by the third processing task, the first processing task, the second processing task, and the third processing task being different video processing tasks.

2. The method of claim 1, wherein
the first buffering task is configured to generate an event indicating that the amount of the first processed subset data stored in the first buffering task is equal to the first threshold.

3. The method of claim 2, wherein
the first buffering task is a first-in-first-out (FIFO) task configured with a FIFO buffer, the FIFO buffer having a FIFO length that is equal to or larger than the first threshold; and
the FIFO task is configured to:
  generate the event indicating that the amount of the first processed subset data stored in the FIFO task is equal to the first threshold; and
  generate another event indicating that the amount of the first processed subset data stored in the FIFO task is provided to the second processing task.

4. The method of claim 1, wherein the subset of the input data is one of a plurality of subsets of the input data.

5. The method of claim 1, wherein a lifecycle of the first processing task includes transitioning between the first paused state and one of the first running state, an error state, and a destroyed state.

6. The method of claim 1, wherein
each input of the plurality of processing tasks is from one of the input data and one or more of the plurality of buffering tasks, and
only one of the plurality of processing tasks is allowed to be in a respective running state at any point in time.

7. The method of claim 1, wherein
the input data includes the subset of the input data and another subset of the input data;
each input of the plurality of processing tasks is from one of the input data and one or more of the plurality of buffering tasks;
after the subset of the input data is processed by the plurality of processing tasks, the method includes sequentially processing the other subset of the input data by the plurality of processing tasks, remaining processing tasks in the plurality of processing tasks being in paused states; and
only one of the plurality of processing tasks is allowed to be in a respective running state at any point in time.

8. A method for processing a plurality of workflows, the method comprising:
receiving, by processing circuitry, workflow information of the plurality of workflows;
generating, based on the workflow information, the plurality of workflows to process input data, at least one of the plurality of workflows including a plurality of processing tasks, the plurality of workflows including a cascade of workflows that includes a first workflow and a second workflow, the plurality of processing tasks being different video processing tasks;
causing the first workflow to enter a running state in which a subset of the input data is processed by the first workflow and output to a buffering task as first processed subset data, the buffering task being a first-in-first-out (FIFO) task configured with a FIFO buffer;
causing the first workflow to transition from the running state to a paused state based on an event that indicates an amount of the first processed subset data stored in the buffering task is equal to a threshold being generated by the FIFO task, state information of the first workflow being stored in the paused state, wherein
the FIFO buffer has a FIFO length that is equal to or larger than the threshold; and
the FIFO task is configured to:
  generate the event indicating that the amount of the first processed subset data stored in the FIFO task is equal to the threshold; and
  generate another event indicating that the amount of the first processed subset data stored in the FIFO task is provided to the second workflow; and
after the first workflow is transitioned to the paused state, causing the second workflow to enter a running state in which the first processed subset data stored in the buffering task is processed by the second workflow.

9. The method of claim 8, wherein the subset of the input data is one of a plurality of subsets of the input data.

10. An apparatus for processing a workflow, the apparatus including:
processing circuitry that is configured to:
  receive workflow information of the workflow;
  generate, based on the workflow information, the workflow to process input data, the workflow including a plurality of processing tasks and a plurality of buffering tasks, the plurality of processing tasks including a first processing task, a second processing task, and a third processing task, the plurality of buffering tasks including a first buffering task and a second buffering task; and
  sequentially process, by the plurality of processing tasks, a subset of the input data by
    causing the first processing task to enter a first running state in which the subset of the input data is processed by the first processing task and output to the first buffering task as first processed subset data;
    causing the first processing task to transition from the first running state to a first paused state based on an amount of the first processed subset data stored in the first buffering task being equal to a first threshold, state information of the first processing task being stored in the first paused state;
    after the first processing task is transitioned to the first paused state, causing the second processing task to enter a second running state in which the first processed subset data stored in the first buffering task is processed by the second processing task and output to the second buffering task as second processed subset data;
    causing the second processing task to transition from the second running state to a second paused state based on one of (i) an amount of the second processed subset data stored in the second buffering task being equal to a second threshold and (ii) the amount of the first processed subset data stored in the first buffering task being provided to the second processing task, state information of the second processing task being stored in the second paused state; and after the second processing task is transitioned to the second paused state, causing the third processing task to enter a third running state in which the second processed subset data stored in the second buffering task is processed by the third processing task, the first processing task, the second processing task, and the third processing task being different video processing tasks.

11. The apparatus of claim 10, wherein the first buffering task is configured to generate an event indicating that the amount of the first processed subset data stored in the first buffering task is equal to the first threshold.

12. The apparatus of claim 11, wherein
the first buffering task is a first-in-first-out (FIFO) task configured with a FIFO buffer, the FIFO buffer having a FIFO length that is equal to or larger than the first threshold; and
the FIFO task is configured to:
generate the event indicating that the amount of the first processed subset data stored in the FIFO task is equal to the first threshold; and
generate another event indicating that the amount of the first processed subset data stored in the FIFO task is provided to the second processing task.

13. The apparatus of claim 10, wherein the subset of the input data is one of a plurality of subsets of the input data.

14. The apparatus of claim 10, wherein a lifecycle of the first processing task includes transitioning between the first paused state and one of the first running state, an error state, and a destroyed state.

15. The apparatus of claim 10, wherein
each input of the plurality of processing tasks is from one of the input data and one or more of the plurality of buffering tasks, and
only one of the plurality of processing tasks is allowed to be in a respective running state at any point in time.

16. The apparatus of claim 10, wherein
the input data includes the subset of the input data and another subset of the input data;
each input of the plurality of processing tasks is from one of the input data and one or more of the plurality of buffering tasks;
only one of the plurality of processing tasks is allowed to be in a respective running state at any point in time; and
the processing circuitry is configured to:
after the subset of the input data is processed by the plurality of processing tasks, sequentially process the other subset of the input data by the plurality of processing tasks, remaining processing tasks in the plurality of processing tasks being in paused states.

* * * * *